United States Patent
Gaisser

(10) Patent No.: US 12,508,713 B2
(45) Date of Patent: Dec. 30, 2025

(54) SYSTEMS AND METHODS FOR ROBOTIC SYSTEM WITH OBJECT HANDLING

(71) Applicant: MUJIN, INC., Tokyo (JP)

(72) Inventor: Floris Gaisser, Tokyo (JP)

(73) Assignee: MUJIN, INC., Tokyo (JP)

( * ) Notice: Subject to any disclaimer, the term of this patent is extended or adjusted under 35 U.S.C. 154(b) by 328 days.

(21) Appl. No.: 18/179,936

(22) Filed: Mar. 7, 2023

(65) Prior Publication Data
US 2023/0286165 A1     Sep. 14, 2023

Related U.S. Application Data

(60) Provisional application No. 63/317,877, filed on Mar. 8, 2022.

(51) Int. Cl.
*B25J 9/16*     (2006.01)
*B65G 47/90*     (2006.01)

(52) U.S. Cl.
CPC .......... *B25J 9/1697* (2013.01); *B25J 9/1664* (2013.01); *B65G 47/905* (2013.01)

(58) Field of Classification Search
CPC ...... B25J 9/1697; B25J 9/1664; B25J 9/1612; B25J 9/16; B65G 47/905; G05B 2219/45063; G05B 2219/40053
See application file for complete search history.

(56) References Cited

U.S. PATENT DOCUMENTS

| | | |
|---|---|---|
| 11,911,919 B2* | 2/2024 | Moreira Rodrigues ..................... B25J 9/1697 |
| 12,269,164 B2* | 4/2025 | Ye .......................... B25J 9/1664 |
| 2022/0371200 A1* | 11/2022 | Yu .............................. G06T 7/60 |
| 2023/0052515 A1* | 2/2023 | Kanunikov ............ B25J 9/1697 |
| 2025/0005889 A1* | 1/2025 | Gaisser ................. B25J 9/1687 |

FOREIGN PATENT DOCUMENTS

| | | |
|---|---|---|
| JP | 2021-088011 A | 6/2021 |
| WO | 2021001882 A1 | 1/2021 |

OTHER PUBLICATIONS

Machine translation of WO2021001882A1 (Year: 2021).*
Office Action issued Jun. 16, 2023 in JP Appl. No. 2023-035588. (11 pages.).
Notice of Reasons for Rejection issued Aug. 1, 2023 in Japan Appl. No. 2023-035588.

* cited by examiner

*Primary Examiner* — Robert T Nguyen
(74) *Attorney, Agent, or Firm* — MEDLER FERRO WOODHOUSE & MILLS PLLC

(57) ABSTRACT

A computing system configured for object transfer is provided. The computing system includes at least one processing circuit configured to identify pickable regions of objects according to image information of the objects. Pickable regions may be determined according to a surface cost map indicating smoothness of regions of the image information, determined according to height differences and normal differences. Identification of pickable regions may be used to in a motion planning operation to transfer the objects.

20 Claims, 34 Drawing Sheets

System 1000

Computing System 1100

Camera 1200

FIG. 1A

System 1500A

Computing System 1100

Camera 1200A    Camera 1200B

FIG. 1B

System 1500B

Computing System 1100

Camera 1200     Robot 1300

FIG. 1C

System 1500C

Computing System 1100

Non-transitory computer-readable medium 1400

Camera 1200

FIG. 1D

Computing System 1100

Processing Circuit 1110

Non-transitory compute-readable medium 1120

FIG. 2A

Computing System 1100A

Processing Circuit 1110

Non-transitory compute-readable medium 1120

Communication Interface 1130

FIG. 2B

SYSTEMS AND METHODS FOR ROBOTIC SYSTEM WITH OBJECT HANDLING

CROSS-REFERENCE TO RELATED APPLICATION(S)

The present application claims the benefit of U.S. Provisional Appl. No. 63/317,877, entitled "ROBOTIC SYSTEM WITH OBJECT DETECTION" and filed Mar. 8, 2022, the entire content of which is incorporated by reference herein.

FIELD OF THE INVENTION

The present technology is directed generally to robotic systems and, more specifically, to systems, processes, and techniques for detecting and handling objects. More particularly, the present technology may be used for identifying pickable regions of objects in containers.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations and/or interactions between robots.

BRIEF SUMMARY

In an embodiment, a computing system is provided. The computing system includes a control system configured to communicate with a robot having a robot arm that includes or is attached to an end effector apparatus and to communicate with a camera; at least one processing circuit configured, when the robot is in an object handling environment including a source of objects for transfer to a destination within the object handling environment, to: obtaining image information of the objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

In an embodiment, a method of object transfer performed by a control system having at least one processing circuit and being configured to communicate with a robot having a robot arm that includes or is attached to an end effector apparatus and to communicate with a camera is provided. The method includes: obtaining image information of one or more objects contained within a source of objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

In an embodiment, a non-transitory computer readable medium configured with executable instructions for object transfer to be performed by a control system having at least one processing circuit and being configured to communicate with a robot having a robot arm that includes or is attached to an end effector apparatus and to communicate with a camera is provided. The instructions may be configured for: obtaining image information of one or more objects contained within a source of objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

BRIEF DESCRIPTION OF THE FIGURES

FIG. 1A illustrates a system for performing or facilitating the detection, identification, and retrieval of objects according to embodiments hereof.

FIG. 1B illustrates an embodiment of the system for performing or facilitating t the detection, identification, and retrieval of objects according to embodiments hereof.

FIG. 1C illustrates another embodiment of the system for performing or facilitating the detection, identification, and retrieval of objects according to embodiments hereof.

FIG. 1D illustrates yet another embodiment of the system for performing or facilitating the detection, identification, and retrieval of objects according to embodiments hereof.

FIG. 2A is a block diagram that illustrates a computing system configured to perform or facilitate the detection, identification, and retrieval of objects, consistent with embodiments hereof.

FIG. 2B is a block diagram that illustrates an embodiment of a computing system configured to perform or facilitate the detection, identification, and retrieval of objects, consistent with embodiments hereof.

DETAILED DESCRIPTION

Figure 2C:
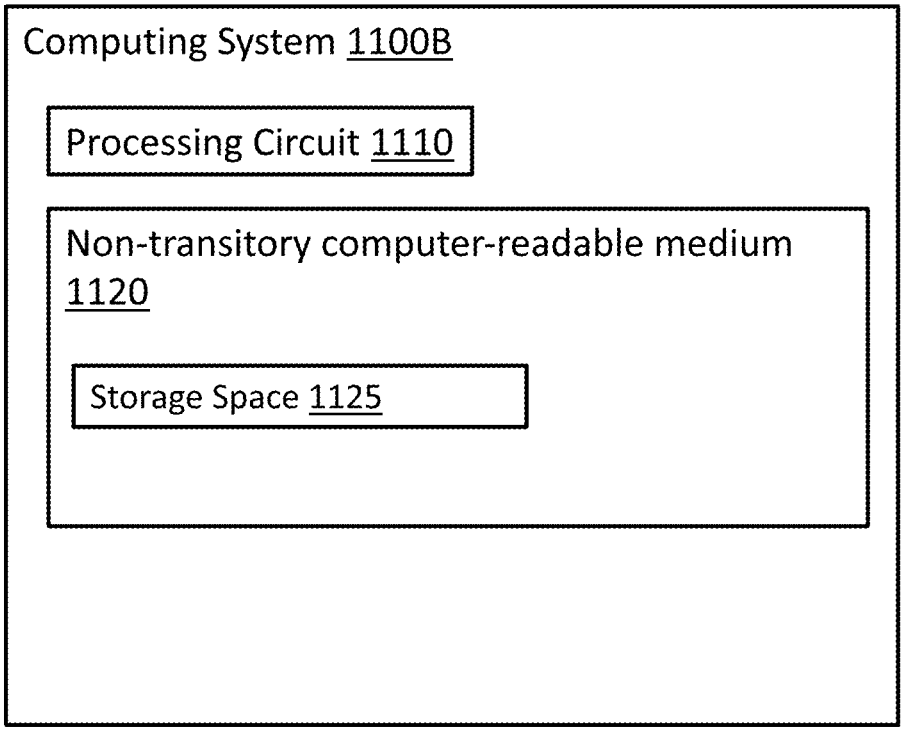
FIG. 2C is a block diagram that illustrates another embodiment of a computing system configured to perform or facilitate the detection, identification, and retrieval of objects, consistent with embodiments hereof.

Systems and methods related to object detection, identification, and retrieval are described herein. In particular, the disclosed systems and methods may facilitate object detection, identification of pickable regions, and object retrieval where the objects are located in containers. As discussed herein, the objects may include boxes, pouches, bags, etc. Object handling in such circumstances may be challenging due to the irregular arrangement of the objects and a difficulty in identifying object regions or portions that are suitable for picking, for example with a suction gripping device. Accordingly, systems and methods described herein are designed to identify pickable regions of objects from among a group of objects, wherein the individual objects may be arranged in different locations, at different angles, etc. The systems and methods discussed herein may include robotic systems. Robotic systems configured in accordance with embodiments hereof may autonomously execute integrated tasks by coordinating operations of multiple robots. Robotic systems, as described herein, may include any suitable combination of robotic devices, actuators, sensors, cameras, and computing systems configured to control, issue commands, receive information from robotic devices and sensors, access, analyze, and process data generated by robotic devices, sensors, and camera, generate data or information usable in the control of robotic systems, and plan actions for robotic devices, sensors, and cameras. As used herein, robotic systems are not required to have immediate access or control of robotic actuators, sensors, or other devices. Robotic systems, as described here, may be computational systems configured to improve the performance of such robotic actuators, sensors, and other devices through reception, analysis, and processing of information.

The technology described herein provides technical improvements to a robotic system configured for use in object identification, pickable region identification, and object transfer. Technical improvements described herein may increase the speed, precision, and accuracy of these tasks and further facilitate the detection, pickable region identification, and transfer of objects from a source container or repository to a destination. The robotic systems and computational systems described herein address the technical problem of identifying, detecting pickable regions, and retrieving objects from a container, where the objects may be irregularly arranged. By addressing this technical problem, the technology of object identification, pickable region detection, and object retrieval is improved.

The present application refers to systems and robotic systems. Robotic systems, as discussed herein, may include robotic actuator components (e.g., robotic arms, robotic grippers, etc.), various sensors (e.g., cameras, etc.), and various computing or control systems. As discussed herein, computing systems or control systems may be referred to as "controlling" various robotic components, such as robotic arms, robotic grippers, cameras, etc. Such "control" may refer to direct control of and interaction with the various actuators, sensors, and other functional aspects of the robotic components. For example, a computing system may control a robotic arm by issuing or providing all of the required signals to cause the various motors, actuators, and sensors to cause robotic movement. Such "control" may also refer to the issuance of abstract or indirect commands to a further robotic control system that then translates such commands into the necessary signals for causing robotic movement. For example, a computing system may control a robotic arm by issuing a command describing a trajectory or destination location to which the robotic arm should move to and a further robotic control system associated with the robotic arm may receive and interpret such a command and then provide the necessary direct signals to the various actuators and sensors of the robotic arm to cause the required movement.

In particular, the present technology described herein assists a robotic system to interact with a target object among a plurality of objects in a container. Methods and systems described herein may identify pickable regions of selected objects from among a group of objects. As described herein, robotic transfer mechanisms (e.g., robot arms) may include suction cups or suction grippers as part of an end effector apparatus for use in gripping, picking, or grasping an object. Such suction based gripping devices may perform better when applied to a smooth surface of an object, e.g., an object portion having a surface contour that is smooth enough for the suction cup to engage and form a seal between the surface of the object and the suction cup to lift and transfer the object. Surfaces that are smooth enough for appropriate engagement with a suction gripping device and large enough to accommodate one or more suction gripping devices in a robotic transfer system may be referred to as "pickable regions." Systems and methods described herein may be employed to identify pickable regions of objects when the objects are loosely organized within a source repository or container.

In the following, specific details are set forth to provide an understanding of the presently disclosed technology. In embodiments, the techniques introduced here may be practiced without including each specific detail disclosed herein.

In other instances, well-known features, such as specific functions or routines, are not described in detail to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics described with respect to any one embodiments can be combined in any suitable manner with those of any other embodiment, unless such items are mutually exclusive. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments may have different configurations or different components than those described in this section. Accordingly, the disclosed techniques may have other embodiments with additional elements or without several of the elements described below.

Many embodiments or aspects of the present disclosure described below may take the form of computer- or controller-executable instructions, including routines executed by a programmable computer or controller. Those skilled in the relevant art will appreciate that the disclosed techniques can be practiced on or with computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, minicomputers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Any reference herein to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

FIG. 1A illustrates a system 1000 for performing object detection, or, more specifically, object recognition. More particularly, the system 1000 may include a computing system 1100 and a camera 1200. In this example, the camera 1200 may be configured to generate image information which describes or otherwise represents an environment in which the camera 1200 is located, or, more specifically, represents an environment in the camera's 1200 field of view (also referred to as a camera field of view). The environment may be, e.g., a warehouse, a manufacturing plant, a retail space, or other premises. In specific embodiments as described herein, the environment may be an object handling environment including one or more source repositories and one or more destination repositories. In such instances, the image information may represent images of objects located at such premises, such as boxes, pouches, bags, bins, cases, etc. Such objects may be located within the source and destination repositories. The system 1000 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

In an embodiment, the camera 1200 (which may also be referred to as an image sensing device) may be a 2D camera and/or a 3D camera. For example, FIG. 1B illustrates a system 1500A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200B's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud (also referred to as a 3D point cloud) that describes locations on one or more surfaces of an object in the camera 1200B's field of view. More specifically, the spatial structure information may describe various locations on a structure of one or more objects (also referred to as an object structure).

In an embodiment, the system 1000 may be a robot operation system for facilitating robot interaction between a robot and various objects in the environment of the camera 1200. For example, FIG. 1C illustrates a robot operation system 1500B, which may be an embodiment of the system 1000/1500A of FIGS. 1A and 1B. The robot operation system 1500B may include the computing system 1100, the camera 1200, and a robot 1300. As stated above, the robot 1300 may be used to interact with one or more objects in the environment of the camera 1200, such as with boxes, pouches, bags, crates, bins, pallets, or other containers. For example, the robot 1300 may be configured to pick up objects from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300 or the robot 3300, discussed below. This is also known as a camera in-hand or a camera on-hand solution. The camera 1200 may be attached to a robot arm 3320 of the robot 1300. The robot arm 3320 may then move to various picking regions to generate image information regarding those regions. In some implementations, the camera 1200 may be separate from the robot 1300. For instance, the camera 1200 may be mounted to a ceiling of a warehouse or other structure and may remain stationary relative to the structure. In some implementations, multiple cameras 1200 may be used, including multiple cameras 1200 separate from the robot 1300 and/or cameras 1200 separate from the robot 1300 being used in conjunction with in-hand cameras 1200. In some implementations, a camera 1200 or cameras 1200 may be mounted or affixed to a dedicate robotic system separate from the robot 1300 used for object manipulation, such as a robotic arm, gantry, or other automated system configured for camera movement. Throughout the specification, "control" or "controlling" the camera 1200 may be discussed. For camera in-hand solutions, control of the camera 1200 also includes control of the robot 1300 to which the camera 1200 is mounted or attached.

In an embodiment, the computing system 1100 of FIGS. 1A-1C may form or be integrated into the robot 1300, which may also be referred to as a robot controller. A robot control system may be included in the system 1500B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1500C, which may be an embodiment of the system 1000/1500A/1500B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more object recognition template used for performing methods and operations discussed herein. The non-transitory computer-readable medium 1120 may alternatively or additionally store computer readable program instructions that, when executed by the processing circuit 1110, causes the processing circuit 1110 to perform one or more methodologies described here.

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

In an embodiment, as depicted in FIG. 2C, the non-transitory computer-readable medium 1120 may include a storage space 1125 configured to store one or more data objects discussed herein. For example, the storage space may store object recognition templates, detection hypotheses, image information, object image information, robotic arm move commands, and any additional data objects the computing systems discussed herein may require access to.

Figure 2D:
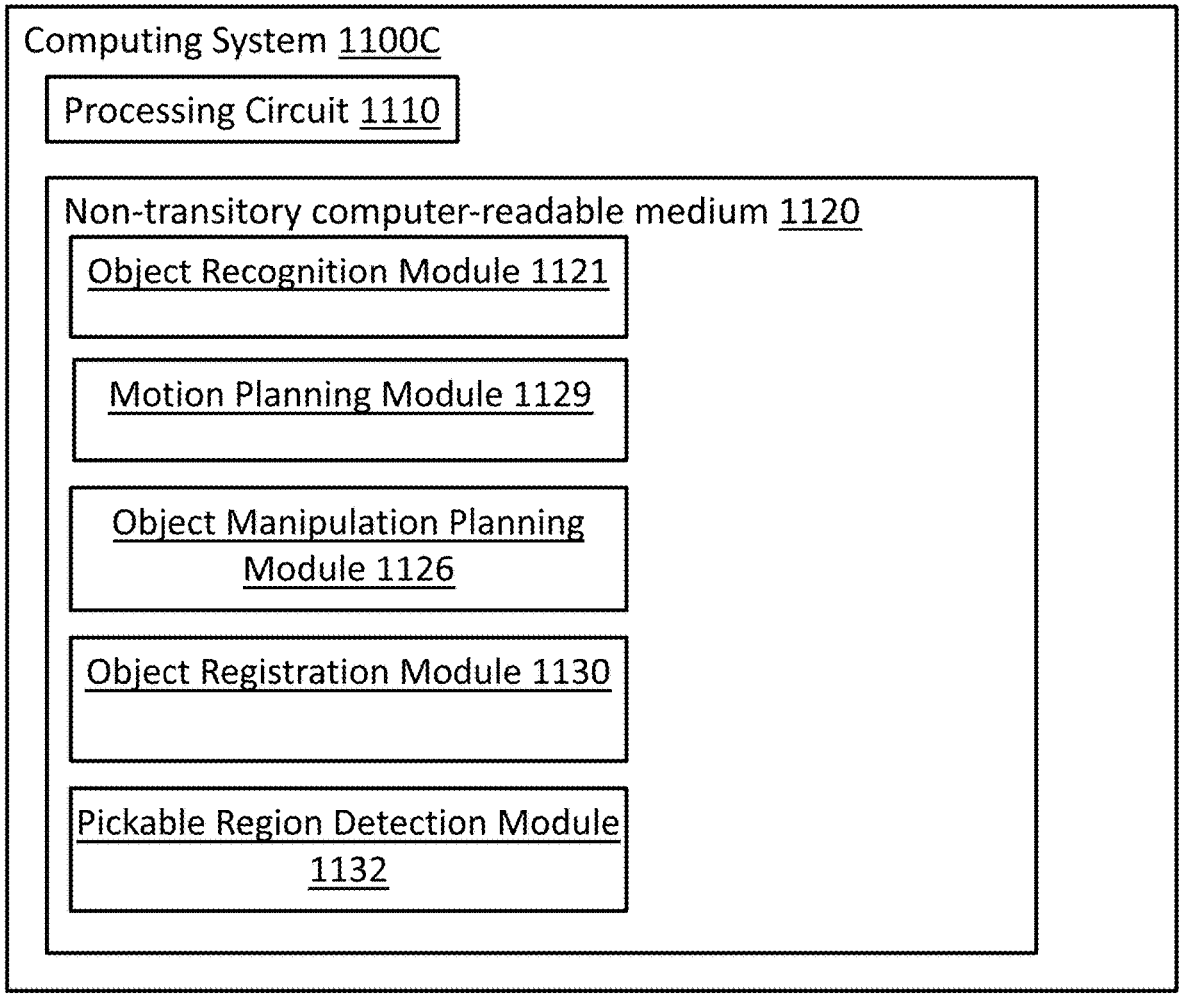
FIG. 2D is a block diagram that illustrates yet another embodiment of a computing system configured to perform or facilitate the detection, identification, and retrieval of objects, consistent with embodiments hereof.

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, a motion planning module 1129, and an object manipulation planning module 1126. The processing circuit 1110 may further be programmed with an object registration module 1130 and a pickable region detection module 1132. Each of the above modules may represent computer-readable program instructions configured to carry out certain tasks when instantiated on one or more of the processors, processing circuits, computing systems, etc., described herein. Each of the above module may operate in concert with one another to achieve the functionality described herein. Various aspects of the functionality described herein may be carried out by one or more of the software modules described above and the software modules and their descriptions are not to be understood as limiting the computational structure of systems disclosed herein. For example, although a specific task or functionality may be described with respect to a specific module, that task or functionality may also be performed by a different module as required. Further, the system functionality described herein may be performed by a different set of software modules configured with a different breakdown or allotment of functionality.

In an embodiment, the object recognition module 1121 may be configured to obtain and analyze image information as discussed throughout the disclosure. Methods, systems, and techniques discussed herein with respect to image information may use the object recognition module 1121. The object recognition module may further be configured for object recognition tasks related to object identification, as discussed herein.

The motion planning module 1129 may be configured plan and execute the movement of a robot. For example, the motion planning module 1129 may interact with other modules described herein to plan motion of a robot 3300 for object retrieval operations and for camera placement operations. Methods, systems, and techniques discussed herein with respect to robotic arm movements and trajectories may be performed by the motion planning module 1129.

The object manipulation planning module 1126 may be configured to plan and execute the object manipulation activities of a robotic arm, e.g., grasping and releasing objects and executing robotic arm commands to aid and facilitate such grasping and releasing.

The object registration module 1130 may be configured to obtain, store, generate, and otherwise process object registration and detection information that may be required for various tasks discussed herein. The object registration module 1130 may be configured to interact or communicate with any other necessary module.

Figure 4:
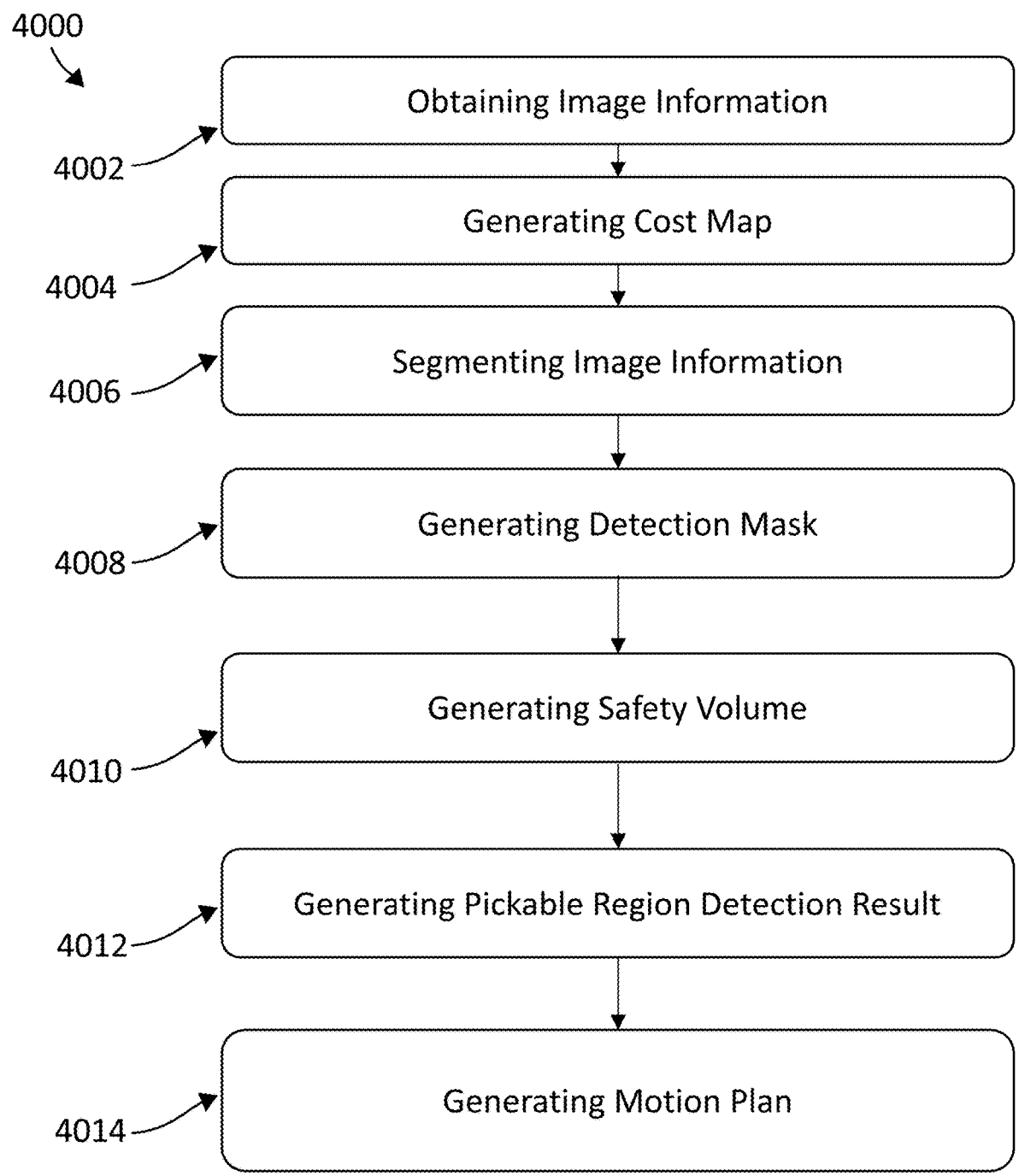
FIG. 4 is a flow chart illustrating an example procedure for handling a detected object.

The pickable region detection module 1132 may be configured to identify pickable regions on the surface of one or more objects, for example, as described with respect to FIG. 4. The pickable region detection module 1132 may be configured to interact or communicate with any other necessary module.

Figure 2E:
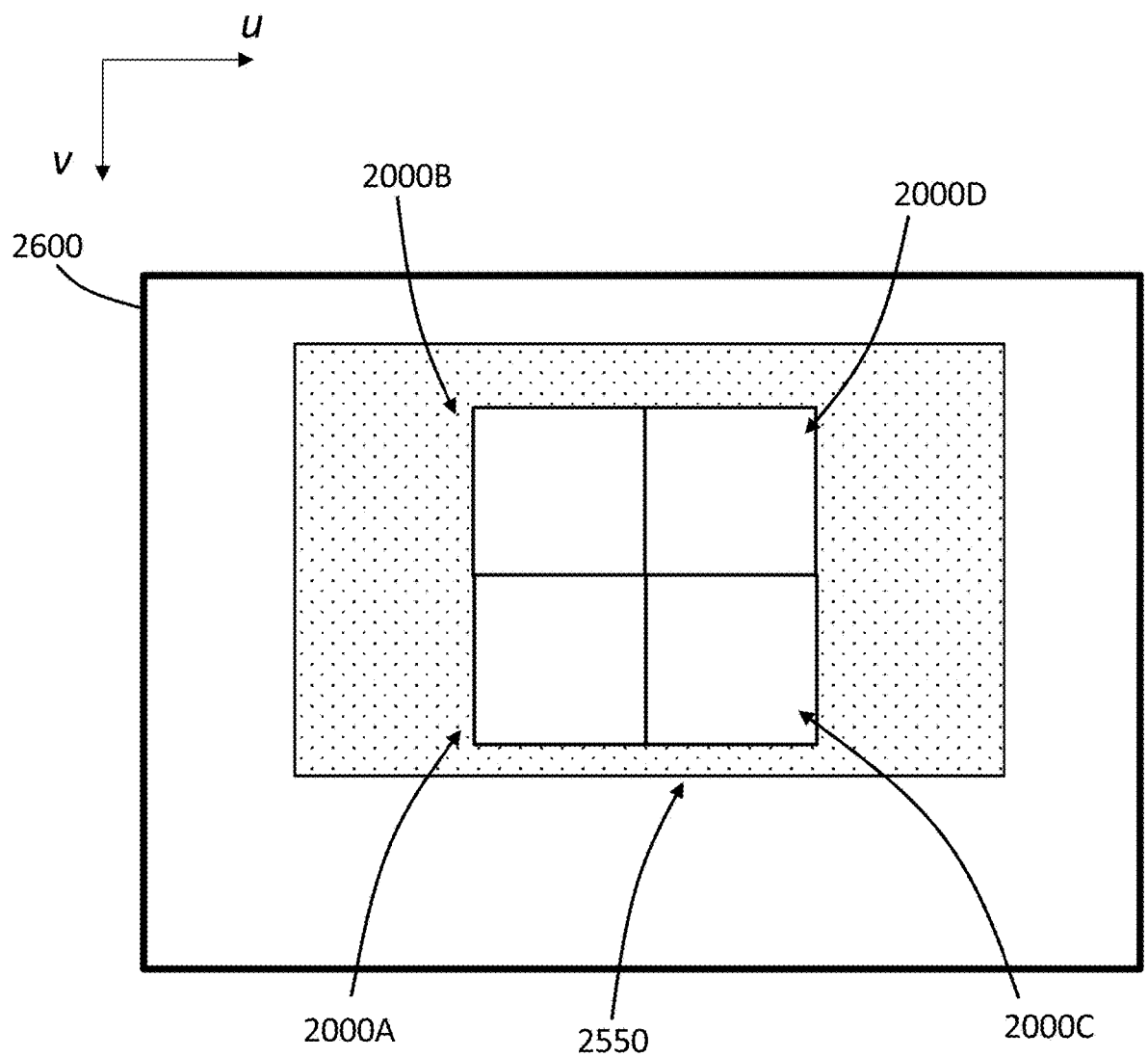
FIG. 2E is an example of image information processed by systems and consistent with embodiments hereof.
Figure 2F:
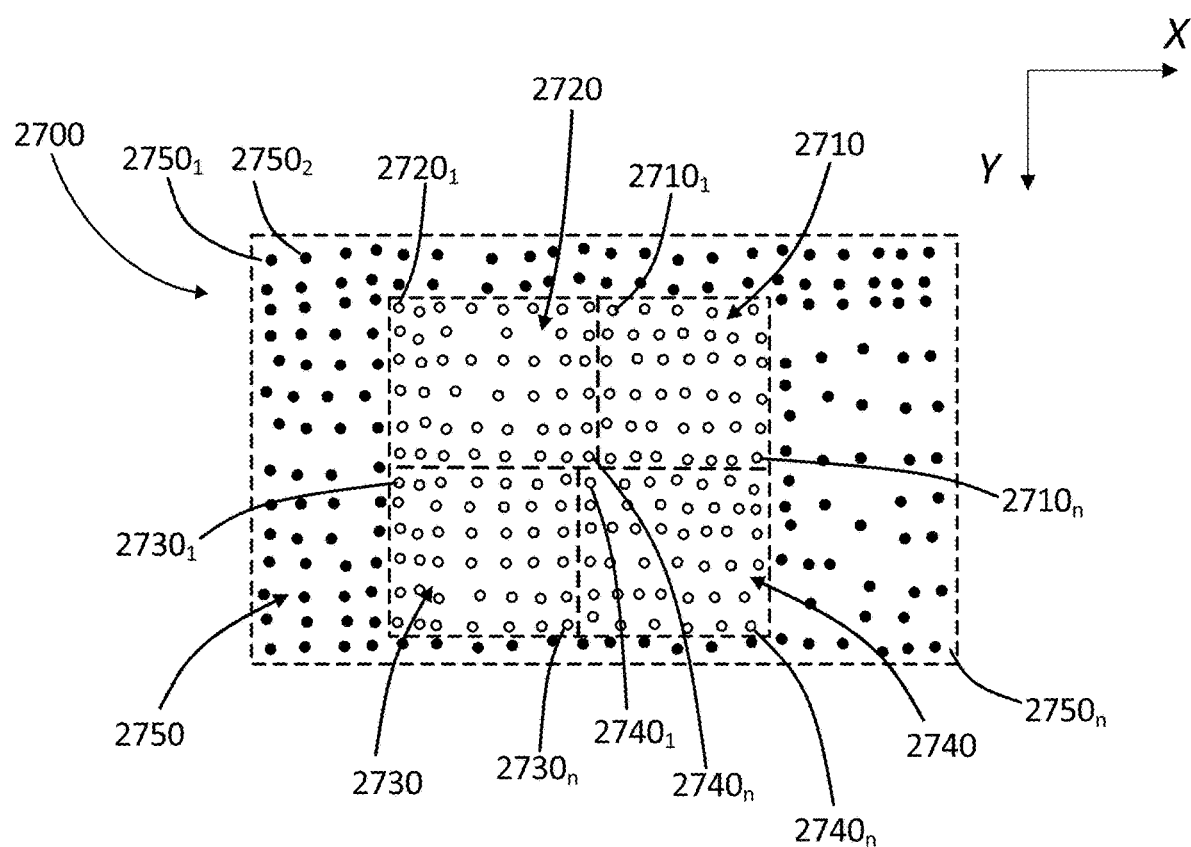
FIG. 2F is another example of image information processed by systems and consistent with embodiments hereof.
Figure 3A:
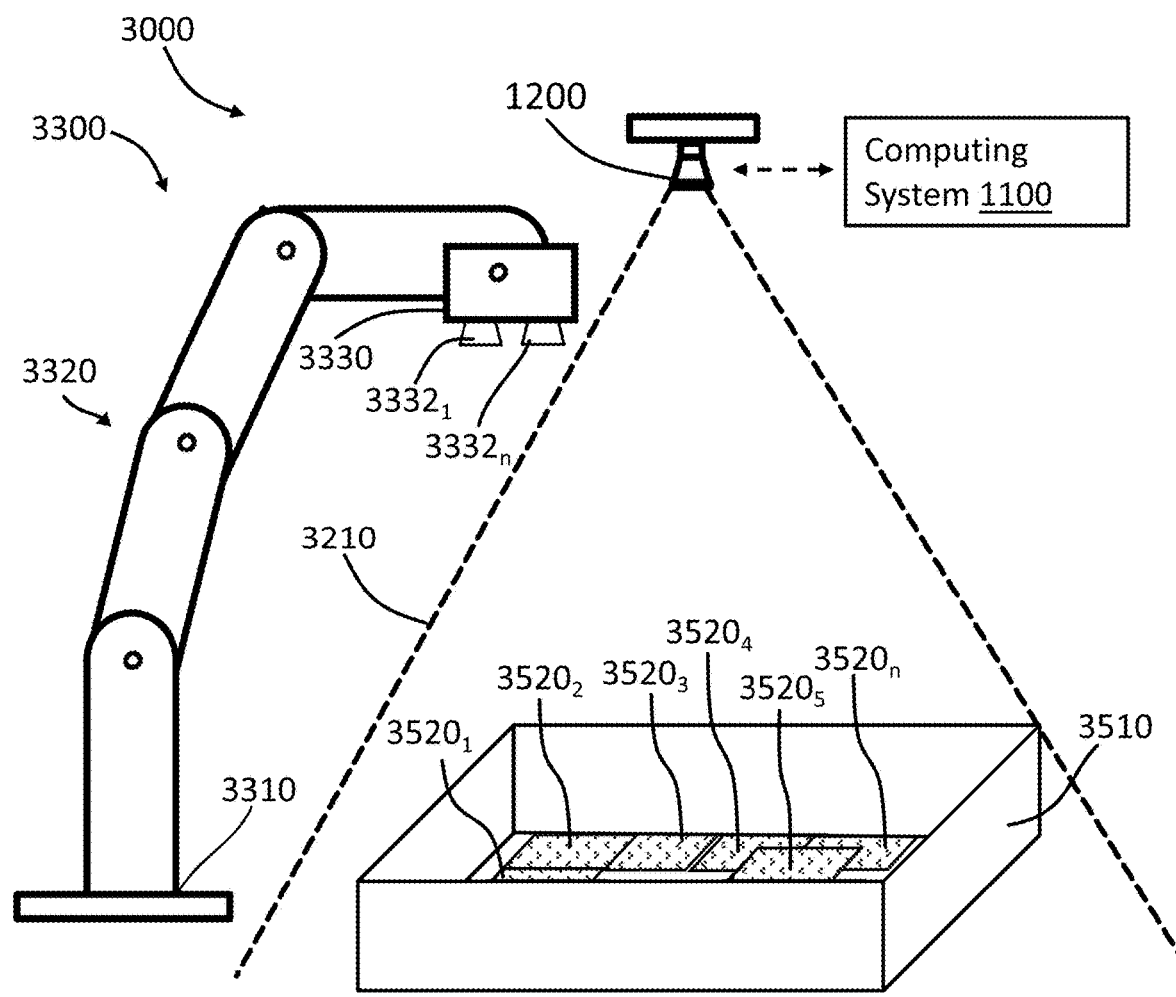
FIG. 3A illustrates an exemplary object handling environment for operating a robotic system, according to embodiments hereof.
Figure 3B:
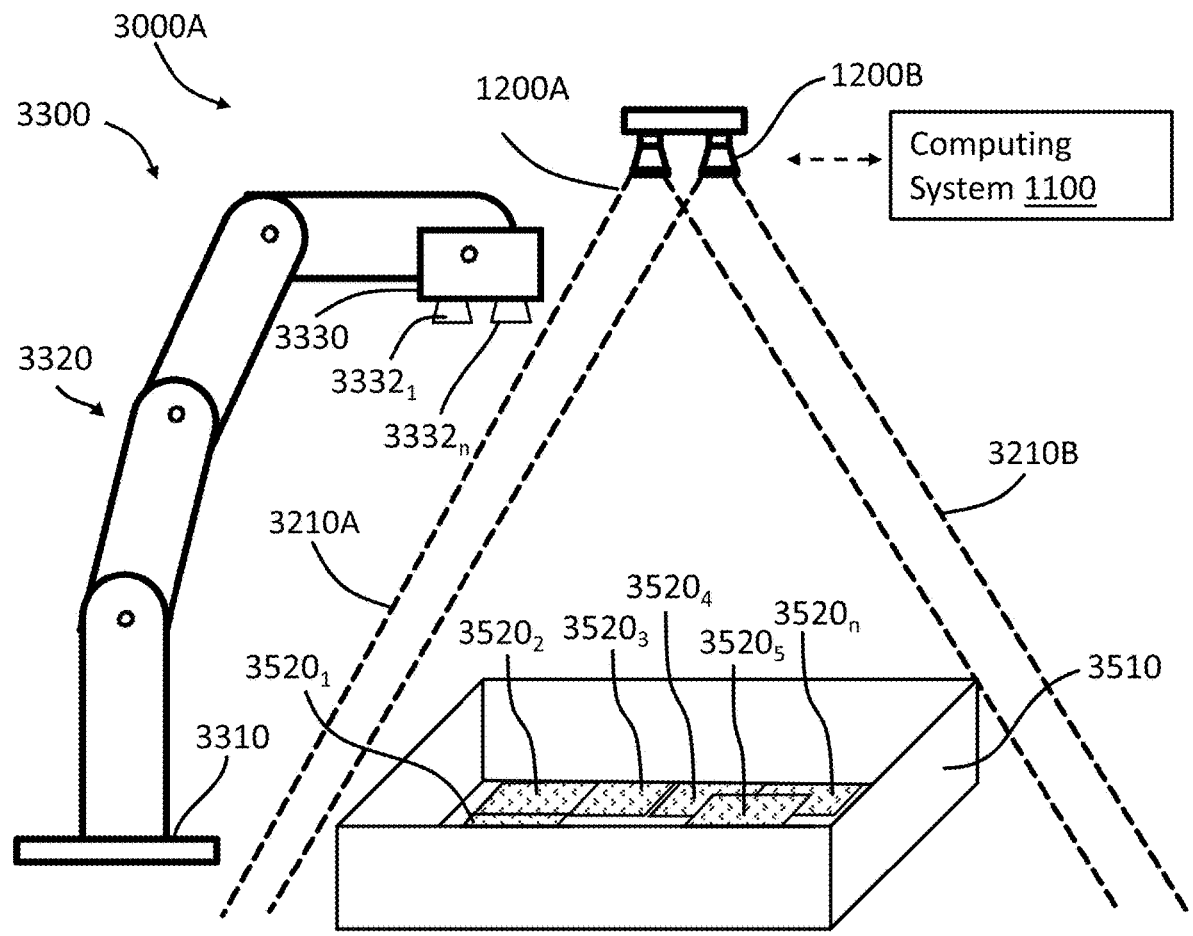
FIG. 3B illustrates an exemplary object handling environment for operating a robotic system, according to embodiments hereof.
Figure 3C:
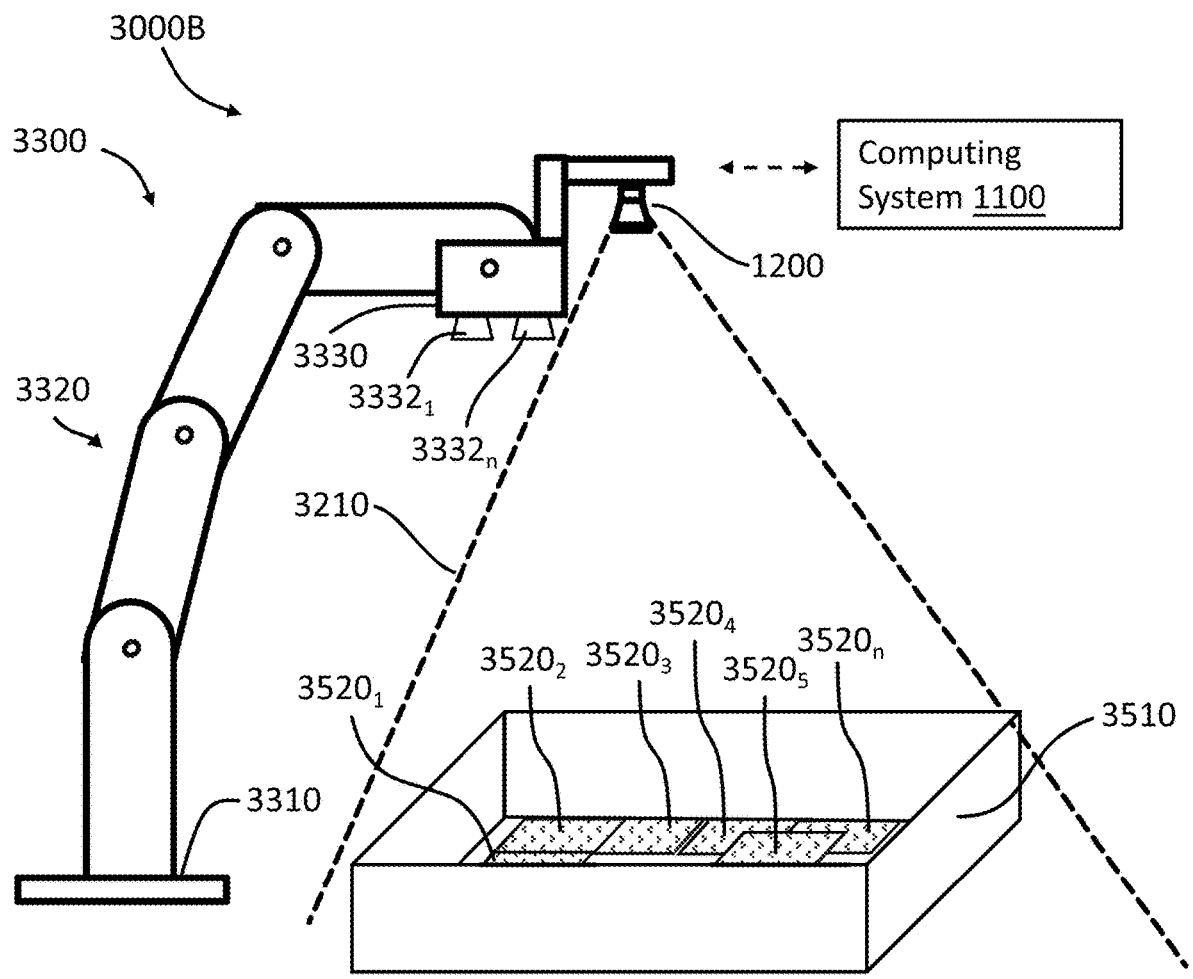
FIG. 3C illustrates an exemplary object handling environment for operating a robotic system, according to embodiments hereof.

With reference to FIGS. 2E, 2F, 3A, 3B, and 3C methods related to the object recognition module 1121 and object registration module 1130 that may be performed for image analysis are explained. FIGS. 2E and 2F illustrate example image information associated with image analysis methods while FIGS. 3A-3C illustrate example robotic environments associated with image analysis methods. References herein related to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

In embodiments, the computing system 1100 may obtain image information representing an object in a camera field of view (e.g., 3210) of a camera 1200. The steps and techniques described below for obtaining image information may be an image information capture operation. In some instances, the object may be one object 3520 from a plurality of objects 3520 in a source container 3510 within the field of view 3210 of a camera 1200. The image information 2600, 2700 may be generated by the camera (e.g., 1200) when the objects 3520 are (or have been) in the camera field of view 3210 and may describe one or more of the individual objects 3520. The object appearance describes the appearance of an object 3520 from the viewpoint of the camera 1200. If there are multiple objects 3520 in the camera field of view, the camera may generate image information that represents the multiple objects or a single object (such image information related to a single object may be referred to as object image information), as necessary. The image information may be generated by the camera (e.g., 1200) when the group of objects is (or has been) in the camera field of view, and may include, e.g., 2D image information and/or 3D image information.

As an example, FIG. 2E depicts a first set of image information, or more specifically, 2D image information 2600, which, as stated above, is generated by the camera 1200 and represents objects 3520, such as those shown in FIGS. 3A-3C. More specifically, the 2D image information 2600 may be a grayscale or color image and may describe an appearance of the objects 3520 from a viewpoint of the camera 1200. In an embodiment, the 2D image information 2600 may correspond to a single-color channel (e.g., red, green, or blue color channel) of a color image. If the camera 1200 is disposed above the objects 3520, then the 2D image information 2600 may represent an appearance of respective top surfaces of the objects 3520. In the example of FIG. 2E, the 2D image information 2600 may include respective portions 2000A/2000B/2000C/2000D/2550, also referred to as image portions or object image information, that represent respective surfaces of the objects 3520. In FIG. 2E, each image portion 2000A/2000B/2000C/2000D/2550 of the 2D image information 2600 may be an image region, or more specifically a pixel region (if the image is formed by pixels). Each pixel in the pixel region of the 2D image information 2600 may be characterized as having a position that is described by a set of coordinates [U, V] and may have values that are relative to a camera coordinate system, or some other coordinate system, as shown in FIGS. 2E and 2F. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information may in some embodiments be all or a portion of an image, such as the 2D image information 2600. In examples, the computing system 1100 may be configured to extract an image portion 2000A from the 2D image information 2600 to obtain only the image information associated with a corresponding object 3520. Where an image portion (such as image portion 2000A) is directed towards a single object it may be referred to as object image information. Object image information is not required to contain information only about an object to which it is directed. For example, the object to which it is directed may be close to, under, over, or otherwise situated in the vicinity of one or more other objects. In such cases, the object image information may include information about the object to which it is directed as well as to one or more neighboring objects. The computing system 1100 may extract the image portion 2000A by performing an image segmentation or other analysis or processing operation based on the 2D image information 2600 and/or 3D image information 2700 illustrated in FIG. 2F. In some implementations, a segmentation or other processing operation may include detecting image locations at which physical edges of objects appear (e.g., edges of the object) in the 2D image information 2600 and using such image locations to identify object image information that is limited to representing an individual object in a camera field of view (e.g., 3210) and substantially excluding other objects. By "substantially excluding," it is meant that the image segmentation or other processing techniques may be designed and configured to exclude non-target objects from the object image information but that it is understood that errors may be made, noise may be present, and various other factors may result in the inclusion of portions of other objects.

FIG. 2F depicts an example in which the image information is 3D image information 2700. More particularly, the 3D image information 2700 may include, e.g., a depth map or a point cloud that indicates respective depth values of various locations on one or more surfaces (e.g., top surface or other outer surface) of the objects 3520. In some implementations, an image segmentation operation for extracting image information may involve detecting image locations at which physical edges of objects appear (e.g., edges of a box) in the 3D image information 2700 and using such image locations to identify an image portion (e.g., 2730) that is limited to representing an individual object in a camera field of view (e.g., 3520).

The respective depth values may be relative to the camera 1200 which generates the 3D image information 2700 or may be relative to another reference point. In some embodiments, the 3D image information 2700 may include a point cloud (3D point cloud) which includes respective coordinates for various locations on structures of objects in the camera field of view (e.g., 3210). In the example of FIG. 2F, the point cloud may include respective sets of coordinates that describe the location of the respective surfaces of the objects 3520. The coordinates may be 3D coordinates, such as [X Y Z] coordinates, and may have values that are relative to a camera coordinate system, or some other coordinate system. For instance, the 3D image information 2700 may include a first image portion 2710, also referred to as an image portion, that indicates respective depth values for a set of locations $2710_1$-$2710_n$, which are also referred to as physical locations on a surface of an object 3520. Further, the 3D image information 2700 may further include a second, a third, a fourth, and a fifth portion 2720, 2730, 2740, and 2750. These portions may then further indicate respective depth values for a set of locations, which may be represented by $2720_1$-$2720_n$, $2730_1$-$2730_n$, $2740_1$-$2740_n$, and $2750_1$-$2750_n$ respectively. These figures are merely examples, and any number of objects with corresponding image portions may be used. Similarly to as stated above, the 3D image information 2700 obtained may in some instances be a portion of a first set of 3D image information 2700 generated by the camera. In the example of FIG. 2E, if the 3D image information 2700 obtained represents an individual object 3520 of FIG. 3A, then the 3D image information 2700 may be narrowed as to refer to only the image portion 2710. Similar to the discussion of 2D image information 2600, an identified image portion 2710 may pertain to an individual object and may be referred to as object image information. Thus, object image information, as used herein, may include 2D and/or 3D image information.

In an embodiment, an image normalization operation may be performed by the computing system 1100 as part of obtaining the image information. The image normalization operation may involve transforming an image or an image portion generated by the camera 1200, so as to generate a transformed image or transformed image portion. For example, if the image information, which may include the 2D image information 2600, the 3D image information 2700, or a combination of the two, obtained may undergo an image normalization operation to attempt to cause the image information to be altered in viewpoint, object pose, lighting condition associated with the visual description information. Such normalizations may be performed to facilitate a more accurate comparison between the image information and model (e.g., template) information. The viewpoint may refer to a pose of an object relative to the camera 1200, and/or an angle at which the camera 1200 is viewing the object when the camera 1200 generates an image representing the object.

For example, the image information may be generated during an object recognition operation in which a target object is in the camera field of view 3210. The camera 1200 may generate image information that represents the target object when the target object has a specific pose relative to the camera. For instance, the target object may have a pose which causes its top surface to be perpendicular to an optical axis of the camera 1200. In such an example, the image information generated by the camera 1200 may represent a specific viewpoint, such as a top view of the target object. In some instances, when the camera 1200 is generating the image information during the object recognition operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with information of an object recognition template. The adjustment may involve transforming the image or image portion to generate a transformed image which matches at least one of an object pose or a lighting condition associated with the visual description information of the object recognition template.

The viewpoint adjustment may involve processing, warping, and/or shifting of the image of the scene so that the image represents the same viewpoint as visual description information that may be included within an object recognition template. Processing, for example, may include altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the object recognition template. If the object recognition template describes a head-on view (e.g., top view) of some object, the image of the scene may be warped so as to also represent a head-on view of an object in the scene.

Further aspects of the object recognition methods performed herein are described in greater detail in U.S. application Ser. No. 16/991,510, filed Aug. 12, 2020, and U.S. application Ser. No. 16/991,466, filed Aug. 12, 2020, each of which is incorporated herein by reference.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

FIGS. 3A-3C illustrate an example environment in which a pickable region (or gripping region) detection operation and/or a motion planning operation may be performed. More specifically, FIG. 3A depicts a system 3000 (which may be an embodiment of the system 1000/1000A/1000B/1000C of FIGS. 1A-1D) that includes the computing system 1100, a robot 3300, and a camera 1200. The camera 1200 may be an embodiment of the camera 1200, and may be configured to generate image information which represents a scene in a camera field of view 3210 of the camera 1200, or more specifically represents objects or their structures in the camera field of view 3210, such as objects $3520_1$ through $3520_n$, which may include, e.g., objects $3520_1$, $3520_2$, $3520_3$, $3520_4$, $3520_5$, ... $3520_n$. In the embodiments of FIGS. 3A-3C, the robot 3300 may be configured to manipulate or otherwise interact with each of the one or more of the objects $3520_1$-$3520_n$, such as by picking up or otherwise gripping one of the objects $3520_1$-$3520_n$, lifting the object from the object's current location, and moving the object to a destination location.

In some instances, some or all of the objects $3520_1$ through $3520_n$ may be a flexible object. For example, each of the objects $3520_1$ through $3520_n$ may be a package that has a piece of clothing (e.g., a shirt or pair of pants) or other textile or fabric, wherein the piece of clothing or other textile may be wrapped in a sheet of packaging material, such as a sheet of plastic. In some scenarios, the sheet of plastic or other packaging material may be generally impermeable to air or other fluids. In the example of FIG. 3A, the objects $3520_1$ through $3520_n$ may be disposed in a container 3510 such as a bin or box used to hold the $3520_1$ through $3520_n$ in a facility, such as a warehouse associated with a clothing manufacturer or retailer. In some instances, some or all of the objects $3520_1$ through $3520_n$ may include items such as boxes, bags, pouches, and other items.

In some scenarios, a flexible object (e.g., $3520_1$) of the embodiments herein may have a sufficiently high level of flexibility to allow the flexible object to deform in shape when being moved or otherwise manipulated by the robot 3300 or when laying in the container 3510. The sufficiently high level of flexibility may correspond with a sufficiently low level of stiffness or rigidity so as to prevent the object from maintaining its shape when it is being moved or otherwise manipulated by the robot 3300. In some instances, the flexible object may have a sufficiently high level of flexibility to permit a weight of the flexible object to cause deformation of its own shape when the flexible object is being lifted by the robot 3300. The deformation may involve, e.g., the flexible object bending, or more specifically sagging, under its own weight when being lifted by the robot 3300. The flexibility of the flexible object may arise from, e.g., dimensions of the flexible object and/or a material of the flexible object. In one example, the flexible object may have a thin profile, which may introduce flexibility (also referred to as pliability) into the flexible object. More specifically, the flexible object may have a thickness dimension which is considerably smaller in size relative to a size of a lateral dimension (e.g., length dimension or width dimension). In one example, the flexible object may be made of a material which is sufficiently soft to introduce flexibility to the flexible object. In some situations, the material of the flexible object may be sufficiently soft so as to sag under the material's own weight when the object is being lifted by the robot 3300. For instance, if the flexible object is package having a piece of clothing, it may be formed from a material, such as cotton fabric or wool fabric, that lacks enough stiffness to prevent the material from sagging under its own weight when being lifted by the robot 3300.

In an embodiment, the robot 3300 (which may be an embodiment of the robot 1300) may include a robot arm 3320 having one end attached to a robot base 3310, and having another end that is attached to or is formed by an end effector apparatus 3330. The robot base 3310 may be used for mounting one end of the robot arm 3320, while the other end of the robot arm 3320, or more specifically the end effector apparatus 3330, may be used to interact with one or more objects (e.g., $3520_1$, $3520_2$, etc.) in an environment of the robot 3300. The interaction may include, e.g., gripping and lifting the one or more objects, and/or moving the one or more objects from a current location to a destination location.

In an embodiment, the end effector apparatus 3330 may include one or more suction cups $3332_1$-$3332_n$. (also referred to herein as suction grippers and suction gripping devices) used to pick up or otherwise lift an object, such as one of the objects $3520_1$-$3520_n$. In some implementations, each of the suction cups $3332_1$-$3332_n$ (also referred to as end effector suction cups) may be a mechanical device that is configured, when pressed into contact against a surface of an object (e.g., $3520_1$), to reduce fluid pressure (e.g., air pressure) in a space between the suction cup and the surface of the object (also referred to as object surface). In an example, the object surface may be formed by a material that is generally impermeable to fluids, or more generally is non-porous, such as a sheet of plastic packaging material used to wrap a piece of clothing. The reduced fluid pressure, such as a partial or complete vacuum, may result in a pressure difference between fluid pressure outside of the space and fluid pressure within the space. More specifically, the fluid pressure within the space may be lower than fluid pressure outside of the space, which may create negative fluid pressure that causes the higher fluid pressure to exert a net force that affixes the suction cup to the object surface. The net force may act as an adhesive force that enables the suction cup to adhere to the object surface, so as to grip the object surface. In an embodiment, each of the suction cups (e.g., $3332_1$ or $3332_n$) may have a variety of shapes (e.g., circular shape) and sizes, and may have a variety of materials, such as plastic, silicone, nitrile, viton, vinyl, urethane, rubber, or some other flexible material. Suction cups are discussed in more detail in U.S. Pat. No. 10,576,630, entitled "Robotic system with a robot arm suction control mechanism and method of operation thereof," the entire contents of which is incorporated by reference herein. In an embodiment, a strength of the adhesive force between the suction cup and the object surface may depend on how tightly the suction cup is able to seal the space between itself and the object surface. For instance, a tight seal may maintain the pressure difference, and thus maintain the adhesive force, while a loose seal may prevent the pressure difference from being maintained, and thus may interfere with an ability of the suction cup to grip the object surface. In an embodiment, an ability of the suction cup to form a tight seal may depend on a level of smoothness at a region of the object surface (also referred to as surface region) at which the suction cup is attempting to grip the object surface. Thus, as discussed below in more detail, the computing system 1100 may be configured to identify or search for a surface region which is sufficiently smooth to be used as a grip region, at which the suction cup can reliably adhere to and thus grip the object surface.

In an embodiment, the camera 1200 may be configured to generate image information which represents the objects $3520_1$-$3520_n$ and the container 3510, or any other object(s) in the camera field of view 3210. The camera 1200 may be a 3D camera that is configured to generate 3D image information, and/or a 2D camera that is configured to generate 2D image information. In an embodiment, the 3D image information may represent the collective object surfaces for the objects 3520, or more specifically describe a physical structure of the object surfaces. For example, the 3D image information may include a depth map, or more generally include depth information, which may describe respective depth values of various locations in the camera field of view 3210 relative to the camera 1200 or relative to some other reference point. The locations corresponding to the respective depth values may be locations on various surfaces in the camera field of view 3210, such as locations on respective object surfaces of the objects $3520_1$ through $3520_n$. In some instances, the 3D image information may include a point cloud, which may include a plurality of 3D coordinates that describe various locations on the respective object surfaces of the objects $3520_1$ through $3520_n$ in the camera field of view 3210.

In an embodiment, an object surface for an object (e.g., $3520_1$) may refer to an outer surface (e.g., top surface) of the object. In such an embodiment, the 3D image information may include information representing the outer surface, or more specifically may describe a physical structure of the outer surface. For example, if the camera 1200 generates the 3D image information by sensing light (e.g., laser or structured light) or other signal reflecting from the outer surface, the 3D information may represent, e.g., a surface contour of the outer surface. If the outer surface is formed by a transparent material, such as a thin sheet of flexible plastic used as packaging material, the 3D information may still represent the outer surface of the object. More particularly, the camera 1200 in such a situation may be sensing light or other signal which has reflected off a non-transparent material, such as a piece of clothing fabric, that is beneath or otherwise covered by the transparent material. The reflected light or signal may pass through the transparent material, and may be detected by the camera 1200 to generate the 3D information. In this situation, the transparent material (e.g., plastic sheet) may be sufficiently thin such that a distance between the outer surface and a surface of the non-transparent material may be considered to be negligible. Thus, in an embodiment, the 3D information may be considered to be describing depth information for various locations on an outer surface of an object. Additionally, if a transparent material forms the outer surface, the transparent material may be sufficiently flexible so that all or many portions of the transparent material adopt a surface contour of the underlying non-transparent material. Thus, the 3D image information in this situation may be considered as describing the outer surface of the object, or more specifically a physical structure or surface contour of the outer surface.

In an embodiment, 2D image information may include, e.g., a color image or a grayscale image that represents an appearance of one or more objects in the camera field of view 3210. For instance, if an object surface has visual markings (e.g., a logo) or other visual detail printed thereon, the 2D image information may describe or otherwise represent the visual detail. As stated above, the object surface may be an object's outer surface, which may in some situations be formed from a transparent material. In such situations, the 2D image information may represent light (e.g., visible light) or other signal which has reflected from a surface of an underlying non-transparent material (e.g., a shirt) and passed through the transparent material forming the outer surface. Because the 2D image information in such a situation is based on light or other signal passing through the outer surface, the 2D image information may still be considered to represent the outer surface. Further, the transparent material forming the outer surface may in some instances be sufficiently thin and sufficiently transparent to have little or negligible effect on an appearance of an object, such that the appearance of the object or of an outer surface of the object may be considered to be referring to an appearance of an underlying non-transparent material (e.g., clothing material).

In an embodiment, the system 3000 may include multiple cameras. For instance, FIG. 3B illustrates a system 3000A (which may be an embodiment of the system 3000) that includes a camera 1200A having a camera field of view 3210A, and including a camera 1200B having a camera field of view 3210B. The camera 1200A (which may be an embodiment of the camera 1200A) may be, e.g., a 2D camera that is configured to generate a 2D image or other 2D image information, while the camera 1200B (which may be an embodiment of the camera 1200B) may be, e.g., a 3D camera that is configured to generate 3D image information.

In an embodiment, the camera 1200/1200A/1200B may be stationary relative to a reference point, such as a floor on which the container 3510 is placed or relative to the robot base 3310. For example, the camera 1200 in FIG. 3A may be mounted to a ceiling, such as a ceiling of a warehouse, or to a mounting frame which remains stationary relative to the floor, relative to the robot base 3310, or some other reference point. In an embodiment, the camera 1200 may be mounted on the robot arm 3320. For instance, FIG. 3C depicts a system 3000B (which may be an embodiment of the system 1000) in which the camera 1200 is attached to or otherwise mounted on the end effector apparatus 3330, which forms a distal end of the robot arm 3320. Such an embodiment may provide the robot 3300 with an ability to move the camera 1200 to different poses via movement of the robot arm 3320.

The computing system 1100 may be configured to generate a pickable region detection result for one or more objects 3520 at the source container 3510. For example, the source container 3510 may include a container with randomly oriented, posed, and located objects 3520. In addition to pickable regions, the pickable region detection results may include additional information, such as detection mask information, a safety volume, or a combination thereof, each of which is described in detail below.

The robot 3300 may further include additional sensors configured to obtain information used to implement the tasks, such as for manipulating the structural members and/or for transporting the robotic units. The sensors can include devices configured to detect or measure one or more physical properties of the robot 3300 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

FIG. 4 provides a flow diagram illustrating an overall flow of methods and operations for the identification of a pickable region of one or more selected objects of the objects in a container. The pickable region identification method 4000 may include any combination of features of the sub-methods and operations described herein. The method 4000 may be carried out or performed by any of the suitable systems and devices described herein.

Figure 5A:
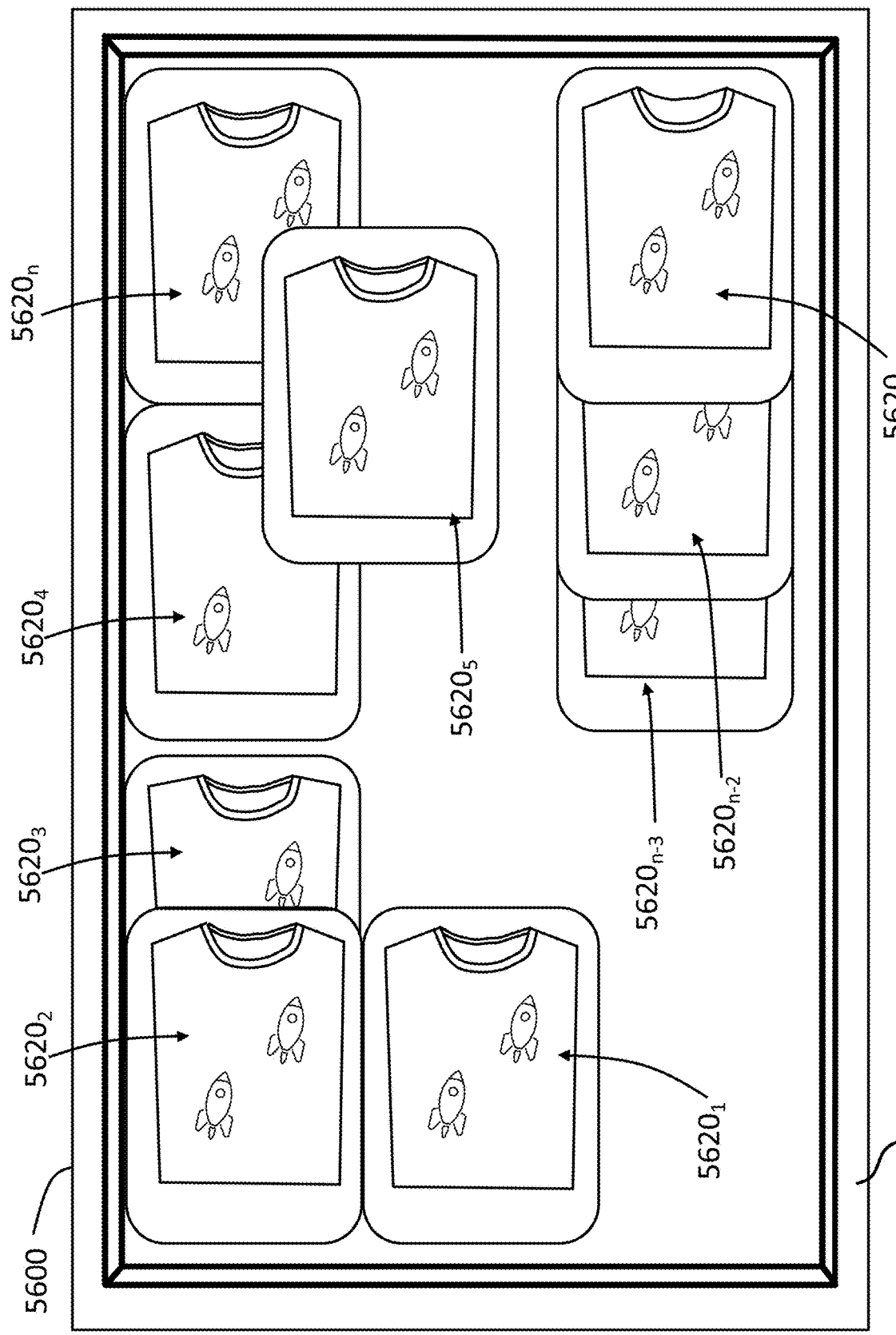
FIG. 5A illustrates an example of 2D image information of a scene consistent with embodiments hereof.
Figure 5B:
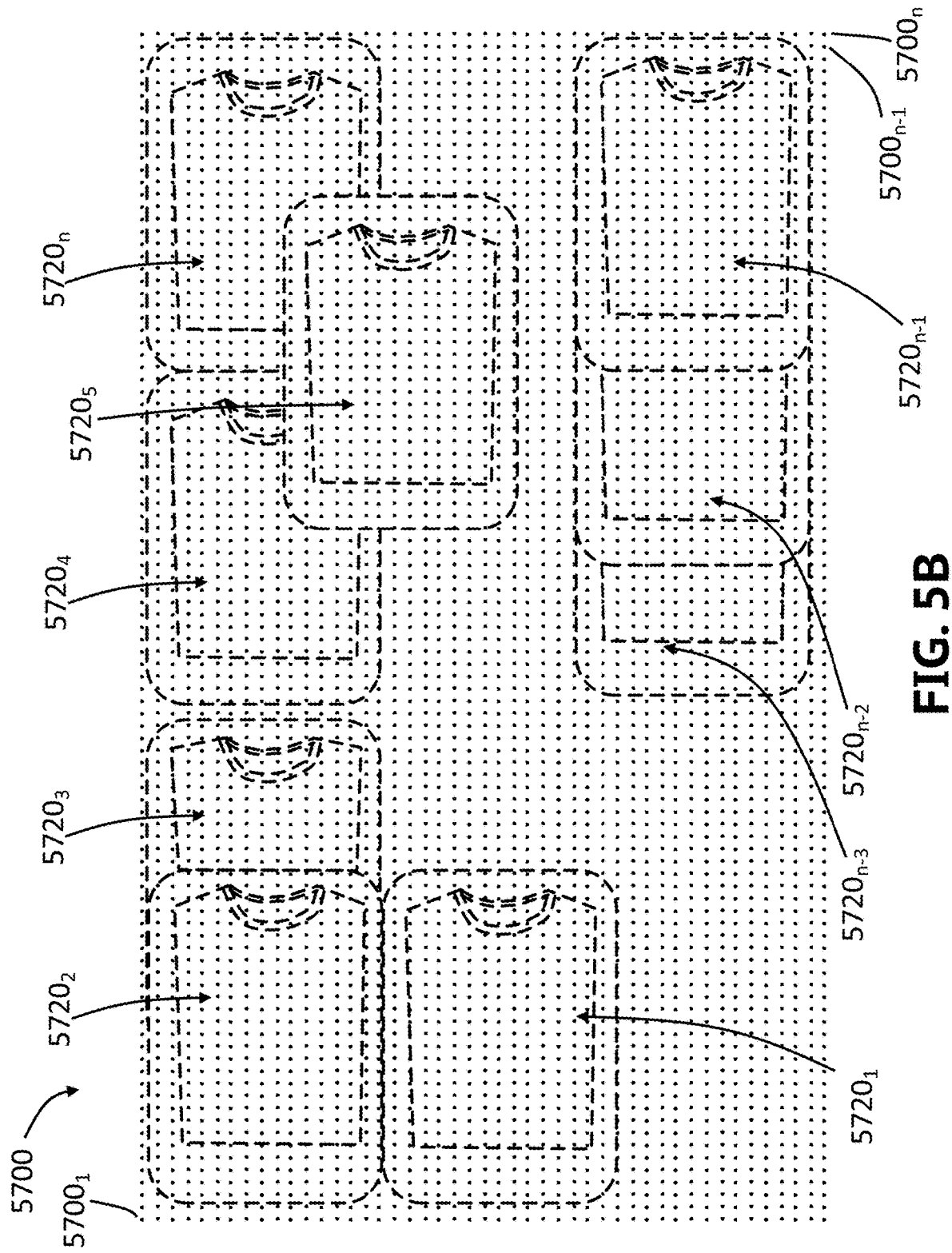
FIG. 5B illustrates an example of 3D image information of a scene consistent with embodiments hereof.

In an operation 4002, the method 4000 includes obtaining image information. Image information of a group or plurality of objects contained in a source container may be obtained by a computing system. The image information may be obtained, for example, through control of a camera and/or may be obtained from a data storage device on which the image information has been stored. The image information of the objects in the scene may include, for example, 3D image information 2700, as discussed herein. FIGS. 5A and 5B provide representative examples of a scene including a plurality of objects represented by 2D image information 5600 (FIG. 5A) and 3D image information 5700 representing the scene (FIG. 5B).

FIG. 5A depicts 2D image information, or more specifically 2D image information 5600, which is generated by the camera 1200/1200A and which represents the objects $3520_1$-$3520_n$ and the container 3510 of FIGS. 3A-3C. More specifically, the 2D image information 5600 may describe an appearance of the objects $3520_1$-$3520_n$ and the container 3510 in which the objects $3520_1$-$3520_n$ are disposed. More specifically, the 2D image information 5600 may include image portions $5610_1$, $5620_2$, $5620_3$, $5620_4$, $5620_5$, ..., $5620_{n-3}$, $5620_{n-2}$, $5620_{n-1}$, $5620_n$ (e.g., pixel regions) that represent visual detail of the objects $3520_1$, $3520_2$, $3520_3$, ..., $3520_n$, respectively. In an embodiment, the 2D image information may represent an object surface for an object (e.g., $3520_1$). As stated above, the object surface may be an outer surface (e.g., top surface) of an object, and may be formed by a transparent material, a non-transparent material (e.g., a translucent or opaque material), or a combination thereof. As further stated above, if the outer surface is formed by a transparent material which covers an underlying non-transparent material, the transparent material may be sufficiently thin and transparent to be considered to have a negligible effect on an appearance of the object. In such instances, an appearance of the underlying non-transparent material may be considered to also be an appearance of an outer surface of the object, such that the 2D image information is considered to represent the appearance of the outer surface of the object.

FIG. 5B illustrates an example of 3D image information 5700. More particularly, the 3D image information 5700 may include, e.g., a depth map or other depth information which indicates respective depth values of various locations in the camera field of view (e.g., 3210/3210A), such as locations $5700_1$, $5700_2$, ... $5700_n$, which may be a grid of locations organized into rows and columns. In some implementations, the depth map may include pixels that indicate respective depth values for the locations $5700_1$-$5700_n$. In an embodiment, at least some of the locations $5700_1$-$5700_n$ are locations on one or more object surfaces, such as object surfaces of the objects $3520_1$-$3520_n$. For example, the 3D image information 5700 may include image portions $5720_1$, $5720_2$, $5720_3$, $5720_4$ $5720_5$, ... $5720_{n-3}$, $5720_{n-2}$, $5720_{n-1}$, $5720_n$, wherein each of the image portions may include depth values for a respective set of locations on an object surface of a respective object (e.g., $3520_1$, $3520_2$, $3520_3$, ..., or $3520_n$). In some situations, the 3D image information may include a point cloud, which may include a set of coordinates that describe the locations $5700_1$-$5700_n$, respectively. The coordinates may be 3D coordinates, such as [X Y Z] Cartesian coordinates, and may have values that are relative to a camera coordinate system, or some other coordinate system. In this example, a [X Y Z] coordinate for a particular location (e.g. $5700_1$) may have a Z-component which is equal to or based on a depth value for that location. The depth value may be relative to the camera (e.g., 1200/1200A) which generated the 3D image information, or may be relative to some other reference point.

In an embodiment, the 3D image information may describe a surface contour of an object surface. For instance, the 3D image information 5700 in FIG. 5A may have at least an image portion $5720_1$ that describes a surface contour of an object surface for the object $3520_1$. A surface contour of the object surface may describe a physical structure of the object surface. In some instances, the physical structure of the object surface may be completely or substantially smooth. In some instances, the physical structure of the object surface may include physical features, such as wrinkles, bumps, ridges, creases, or depressions, which may form one or more non-smooth portions of the object surface.

As stated above, the object surface may be an outer surface (e.g., top surface) of an object, and may be formed by a transparent material, a non-transparent material (e.g., a translucent or opaque material), or a combination thereof. As further stated above, if the outer surface is formed by a transparent material which covers an underlying non-transparent material, the transparent material may be sufficiently thin and flexible to be considered to have a negligible effect on a physical structure or surface contour of the object. In such instances, 3D image information which represents a physical structure or surface contour of the underlying non-transparent material may be considered to also represent a physical structure or surface contour of the outer surface of the object. Further, if the transparent material is sufficiently thin, its thickness may be considered to have a negligible effect on depth measurement by a camera (e.g., 1200). In such a situation, the various locations that have depth values represented in the 3D image information, such as locations of image portion $5720_1$, may be considered to be locations on an outer surface of a corresponding object (e.g., $3520_1$).

In an embodiment, obtaining the image information, which may include object detection and object registration, may be carried out by any suitable means. In embodiments, identifying or detecting the plurality of objects 3520 may include a process including object registration, template generation, feature extraction, hypothesis generation, hypothesis refinement, and hypothesis validation, as performed, for example, by the object registration module 1130. These processes are described in detail in U.S. patent application Ser. No. 17/884,081, filed Aug. 9, 2022, the entire contents of which are incorporated herein in their entirety.

Object registration is a process that includes obtaining and using object registration data, e.g., known, previously stored information related to an object 3520, to generate object recognition templates for use in identifying and recognizing similar objects in a physical scene. Template generation is a process that includes generating sets of object recognition templates for the computing system to use in identifying the objects 3520 for further operations related to object picking. Feature extraction (also referred to as feature generation) is a process that includes extraction or generation of features from object image information for use in object recognition template generation. Hypothesis generation is a process that includes generating one or more object detection hypotheses, for example based on a comparison between object image information and one or more object recognition templates. Hypothesis refinement is a process to refine matching of the object recognition template with the object image information, even in scenarios where the object recognition template does not match exactly to the object image information. Hypothesis validation is a process by which a single hypothesis from multiple hypotheses is selected as a best fit or best choice for an object 3520.

In an operation 4004, the method 4000 includes generating a surface cost map of the plurality of objects 3520 in the scene 3520. The surface cost map may be an image map that is indicative of the smoothness of the surface of the collected plurality of objects 3520 or of portions of the objects 3520. The surface cost map may be an image map that identifies surface irregularities or discontinuities in the surface of the collected plurality of objects 3520 or of portions of the objects 3520. The surface cost map may include a surface cost map value for each point or pixel representing the surface or top layer of the collected plurality of objects 3520 or portion thereof. Thus, the surface cost map may assign a surface cost map value to each point of a point cloud representative of the plurality of objects 3520 or a portion thereof. As discussed above, each point/pixel of the point cloud may be represented by three coordinates (x, y, z). The surface cost map values are representative of differences between collections of points, referred to herein as kernels or cells, and neighboring kernels. Thus, the surface cost map value assigned to any point or kernel may be representative of differences between that point or kernel and neighboring points or kernels.

The surface cost map, which is generated according to the image information 5700, may represent differences in height and angle between a kernel or cell and a neighboring kernel or cell. The surface cost map may include a height gradient map and a normal difference map or may be computed from a combination of a height gradient map and a normal difference map. A surface cost map may be computed or determined from a variety of means to represent the height and angular differences between neighboring portions of the 3D image information 5700 representative of a plurality of objects in a scene. In an embodiment, computation of a surface cost map may be performed as follows, with reference to FIGS. 6A-6I.

Figure 6A:
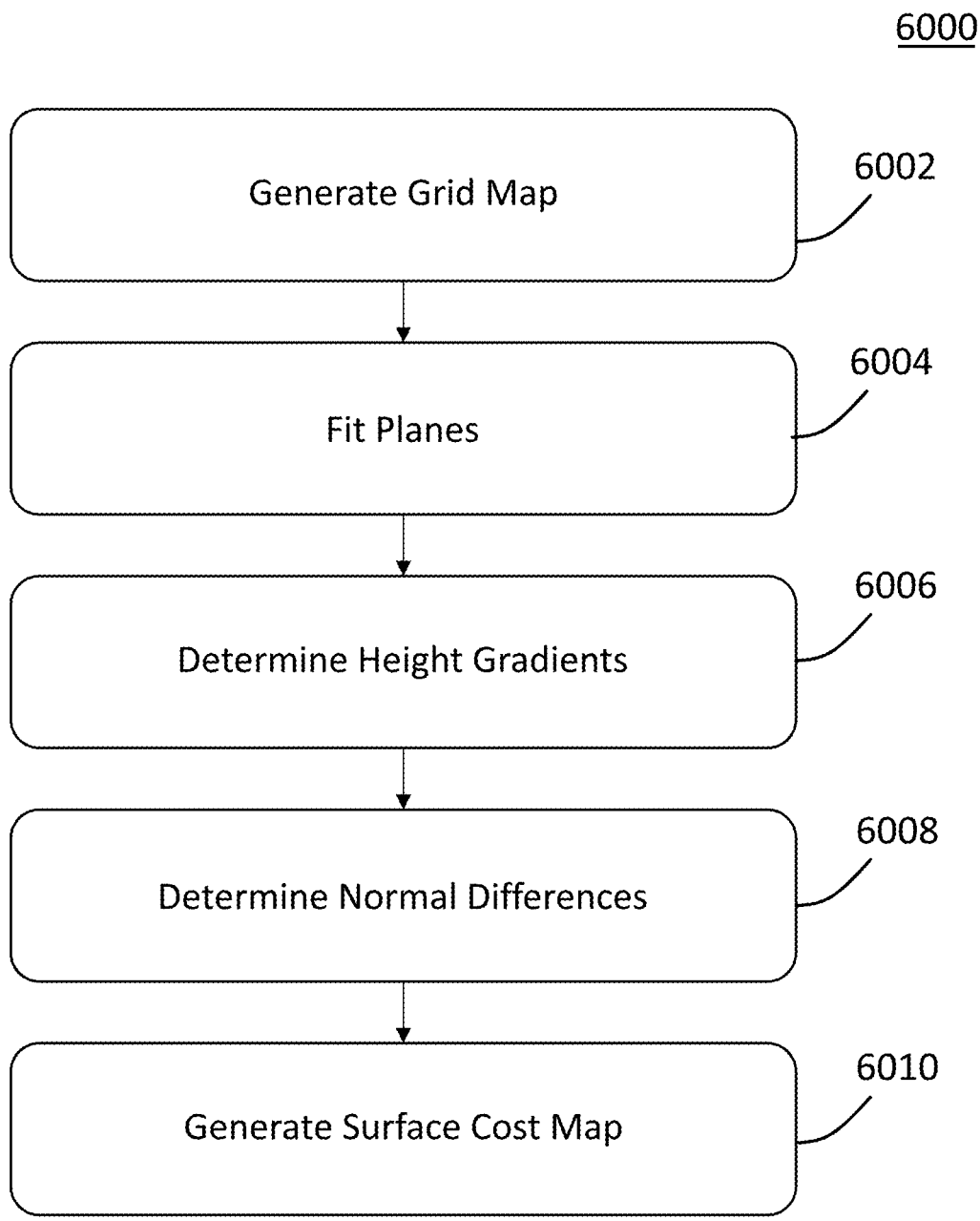
FIG. 6A provides an example flow chart for a surface cost map generation method consistent with embodiments hereof.

FIG. 6A provides an example flow chart for a surface cost map generation method 6000. The method 6000 may be carried out by any suitable processor or computational device described herein. The steps of FIG. 6A are provided by way of example only. The steps of FIG. 6A may be executed in any suitable order or combination and/or may be incorporated with additional steps as necessary. Further, alternative methods of generating a surface cost map may be employed without departing from the scope of this disclosure.

The surface cost map may be generated from the 3D image information 5700 to include or be provided as a combination of a height gradient map and a normal difference map based on several cost map parameters. Such cost map parameters, explained in greater detail below, may include kernel, stride, distance threshold, normal threshold, and normal weight factor. The cost map parameters may be manually determined and or automatically determined, as described further below.

Figure 6B:
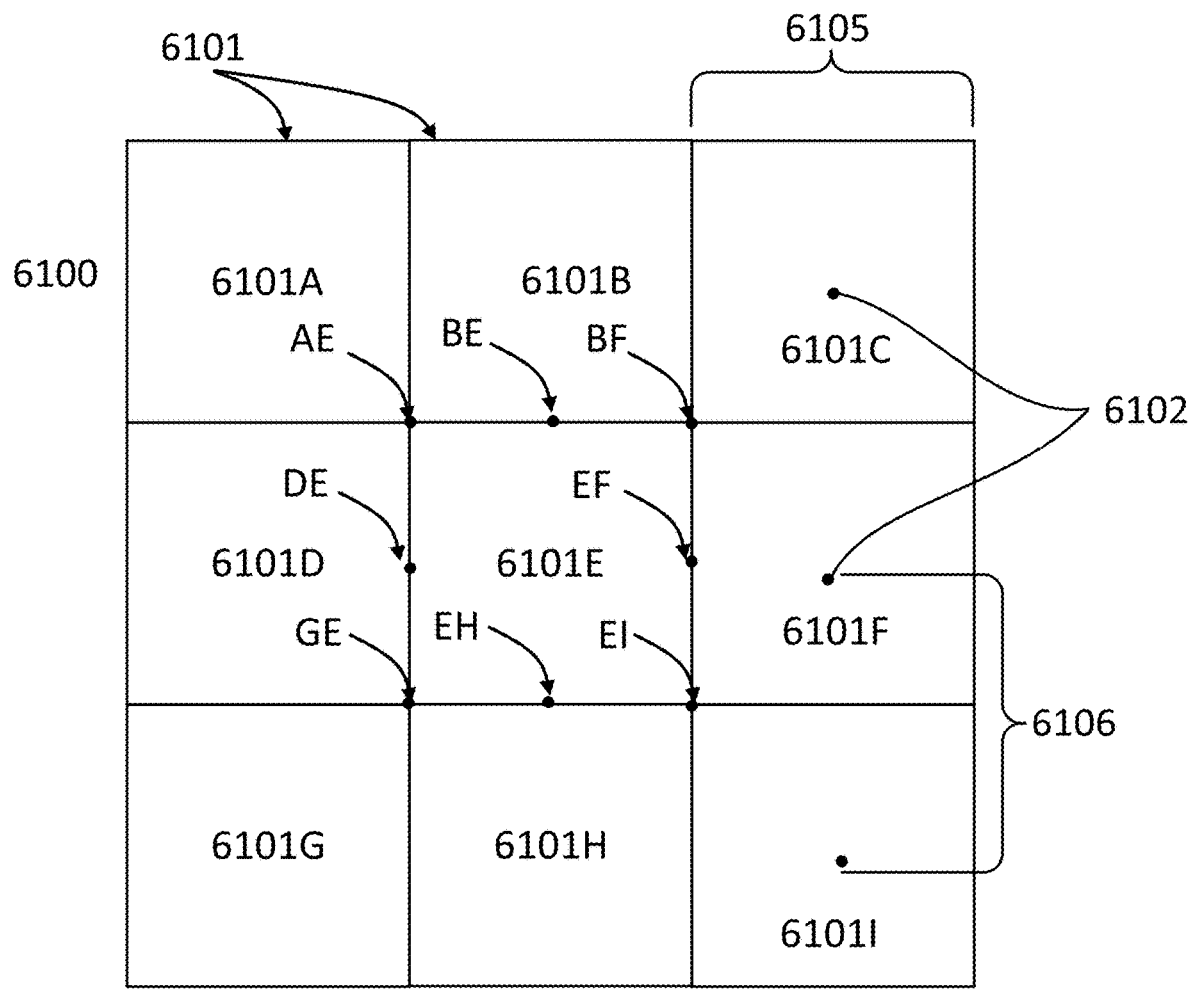
FIGS. 6B-6E provide examples of aspects of a surface cost map generation method consistent with embodiments hereof.
Figure 6C:
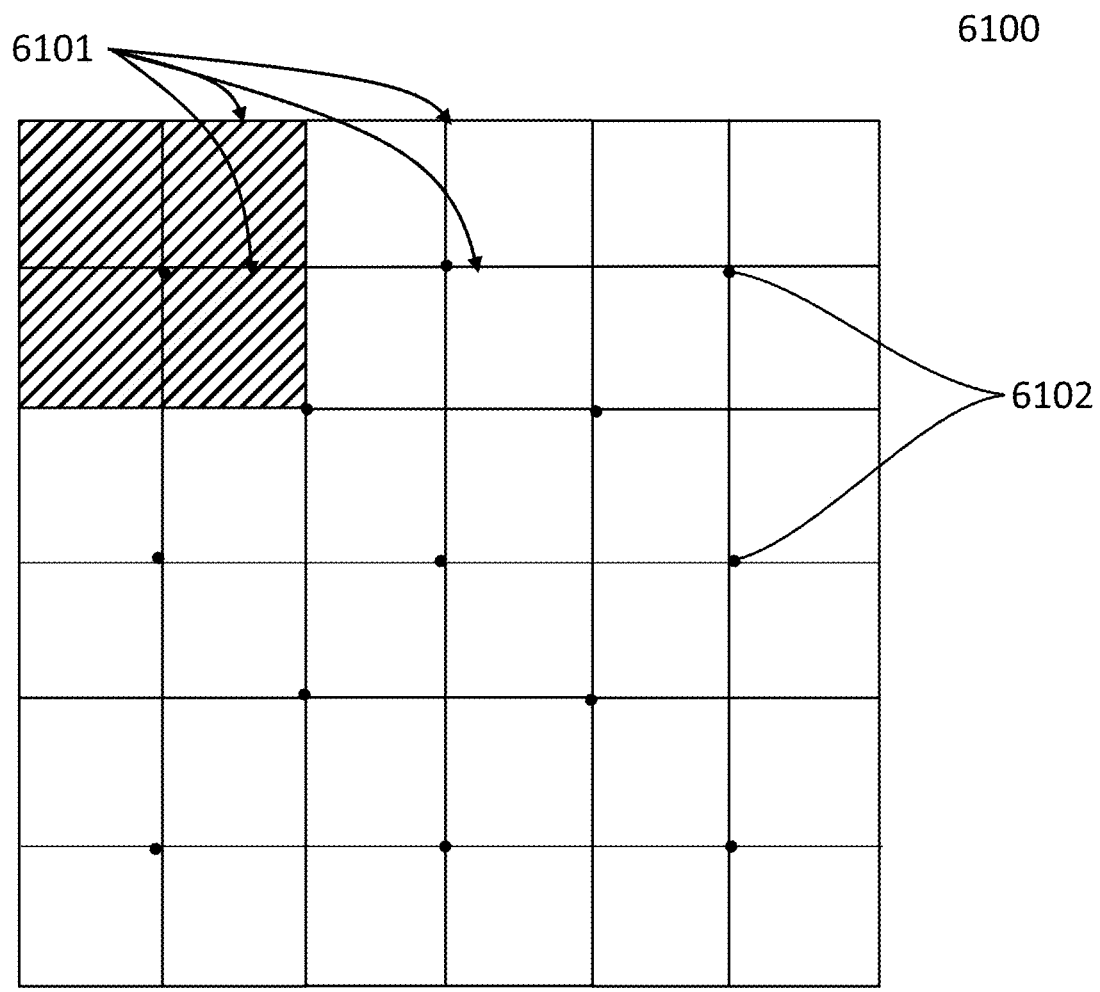

In an operation 6002 of a surface cost map generation method 6000 the 3D image information 5700 maybe overlaid with a grid 6100 of cells 6101. FIGS. 6B and 6C illustrate a gridding operation of the surface cost map generation method. The cells 6101 may be rectangular or square and may be sized according to a kernel. The kernel may represent the size of each cell 6101, as shown by dimension 6105, in points or pixels of the point cloud represented by the 3D image information 5700, such as 2×2, 4×4, 6×6, 8×8, 10×10, 15×15, 20×20, or any other suitable size. The cells 6101 form a grid over which the surface cost map calculations may be performed. In embodiments, the 3D image information 5700 may be gridded with a single non-overlapping set of cells 6101, as illustrated in FIG. 6B. The cell centers 6102 are each separated from one other by a stride with a length (dimension 6106) that is equal to the kernel size, thus creating a non-overlapping grid.

In further embodiments, the grid 6100 overlaying the 3D image information 5700 may include a set of overlapping cells 6101. Each cell 6101 may overlap with a plurality of additional cells 6101, with the cell centers 6102 separated by a stride smaller than the kernel size. Thus, for example, as shown in FIG. 6C, cells 6101 may have cell centers 6102 separated by a stride size that is half the kernel size. In FIG. 6C, the grid 6100 includes cell centers 6102, each separated by a stride size and cells 6101 that have width and length dimensions equal to twice the stride size. In FIG. 6C, the size of a single cell 6101 is illustrated by the shaded area. Each cell 6101 overlaps with four other cells 6101.

In the following discussion of surface cost map calculations, surface cost map values are assigned to the cell centers 6102 and, when performing calculations, each cell 6101 is compared to its non-overlapping neighboring cells 6101. Accordingly, for the purpose of clarity, the non-overlapping arrangement of FIG. 6B will be referred to.

Figure 6D:
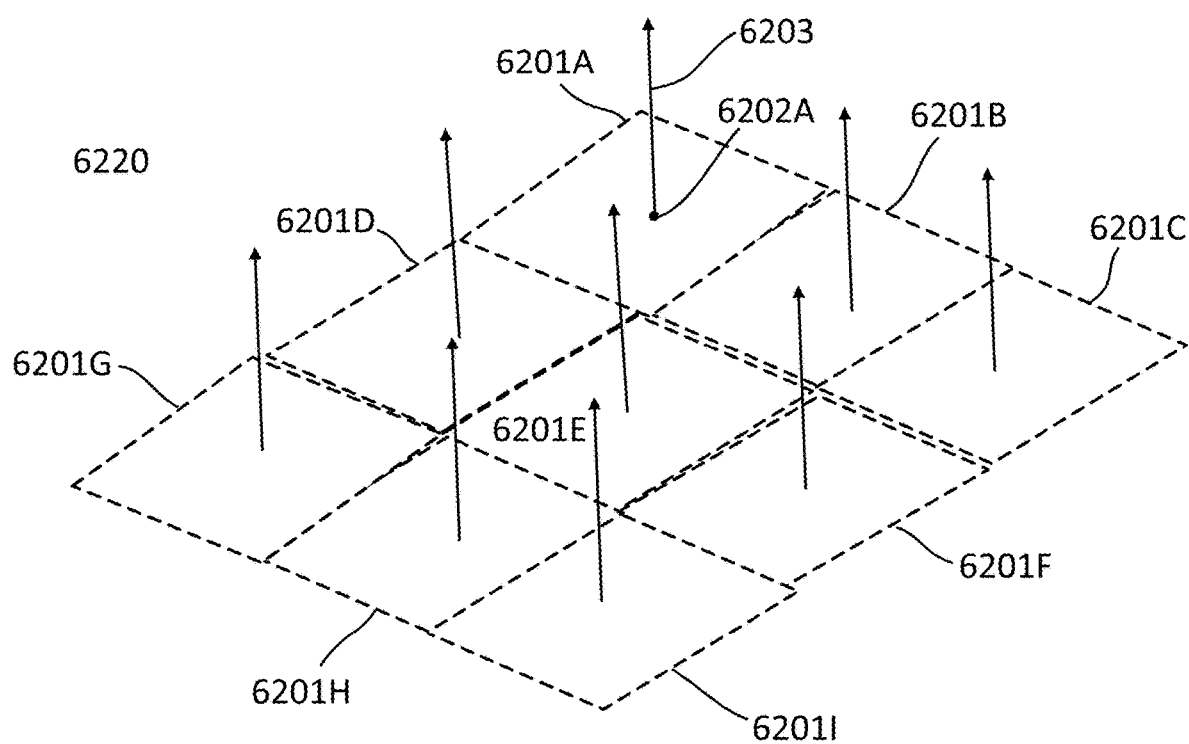

In an operation 6004, the surface cost map generation method 6000 may include a step of fitting planes to each cell 6101. FIG. 6D illustrates a set of planes 6220 corresponding to the grid 6100. For each cell 6101, a plane 6201 may be determined according to the x, y, and z coordinates of the points in the 3D image information 5700 that are encompassed by the cell 6101. Thus, for a kernel size of 20×20, 400 points of the 3D image information 5700 may be used to determine the plane 6201. The plane 6201 may be determined according to any suitable method, including, for example, a least squares method. In another example, the plane 6201 may be determined according to an average of normal vectors at each point within the 3D image information 5700 within each cell 6101. Each plane 6201 includes a centroid 6202 and a normal 6203. The centroid 6202 is located at the geometric center of the plane 6201 and the normal 6203 extends orthogonally to the plane 6201 from the centroid 6202. The height of each plane 6201 may be defined as the height of its centroid 6202.

Figure 6E:
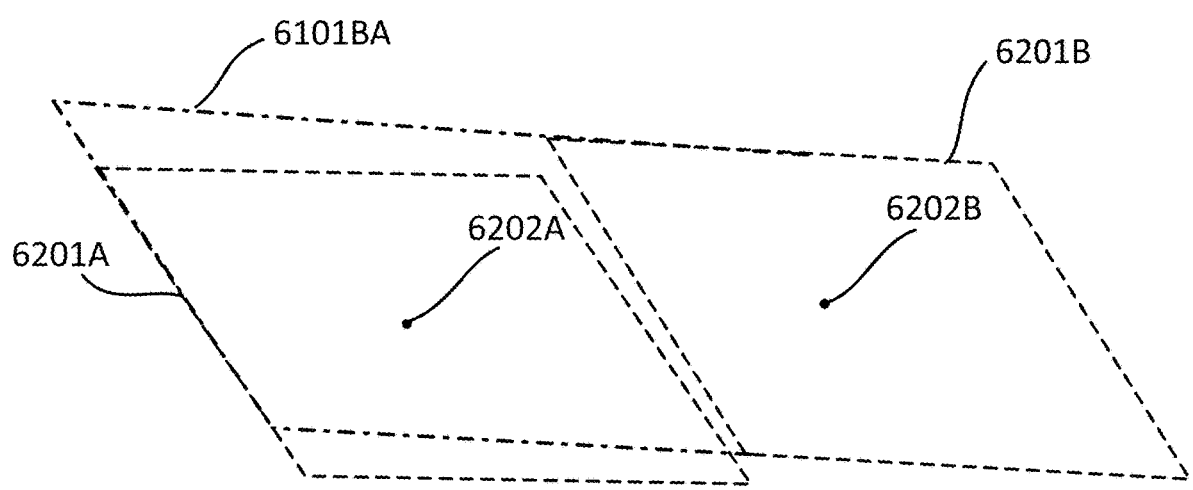
Figure 6F:
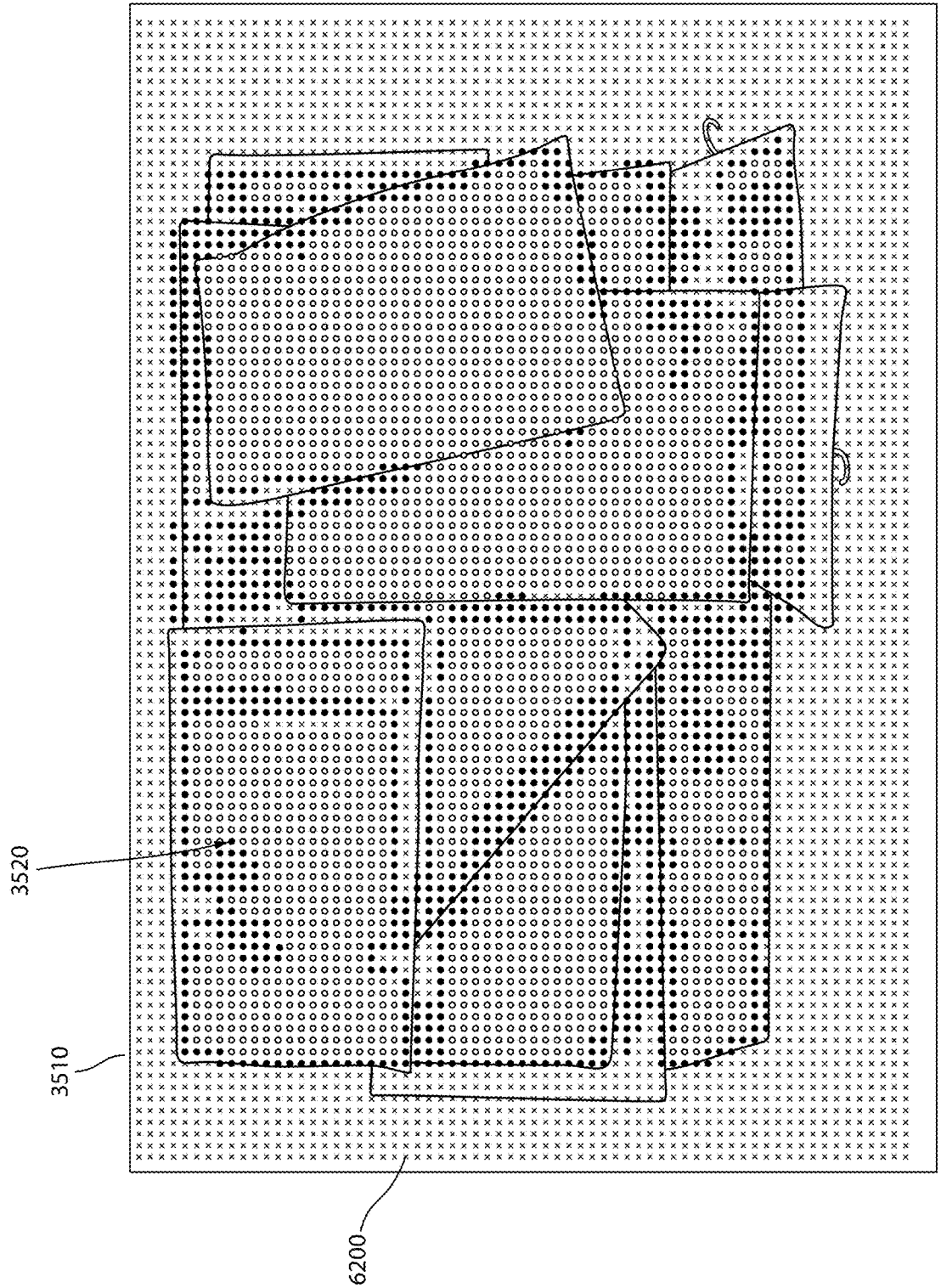
FIG. 6F provides an example of a height gradient cost map consistent with embodiments hereof.

In an operation 6006, the surface cost map generation method 6000 may include calculating or determining the height gradient of each plane 6201 with respect to its neighboring planes 6201. FIG. 6F illustrates the height gradient cost map 6200 overlaid on a representation of the source container 3510 containing the objects 3520. The height gradient of each plane 6201 may be a mathematical combination of the individual height gradients between a plane 6201 and its eight neighboring planes 6201. The height gradient of each plane 6201 may be determined in several different ways. As shown in FIG. 6F, open circles illustrate portions of low height gradient, closed circles illustrate portions of higher height gradient, and crosses illustrate portions that cannot be identified as objects, for example due to unreliable detection or detection of the source container 3510. For illustration purposes, the values are shown as high and low, when in practice the values may span a range of potential values. It can be seen that height gradients at the boundaries of objects 3520 are larger than height gradients across central portions of the objects 3520.

In an embodiment, a cost map height gradient between a plane 6201 and a neighboring plane 6201 may be determined as follows, with reference to FIG. 6E. First, the height difference between the two planes (6201A and 6201B) may be determined. In an embodiment, the height difference of neighboring planes may be based on an extension (e.g., extended plane 6201BA) of one plane 6201B over the other plane 6201A. The height difference may be determined, for example, as the height difference between the first extended plane 6201BA and the centroid 6202A of the second plane 6201A, computed either according to a length of a normal vector of either plane or according to a vector in the z direction of the 3D point cloud. The height difference may be determined, for example, as the average height difference between corresponding points on the first extended plane 6201BA and the second plane 6201A, wherein the corresponding points correspond grid points in the point cloud of the 3D image information 5700. In embodiments, the height difference between the two planes 6201A and 6201B may be determined as the maximum or the average height difference between the height difference as determined by extending plane 6201B over (or under) plane 6201A and the height difference as determined by extending plane 6201A over (or under) plane 6201B. This height difference determination method may result in identical height differences regardless of which of two planes is chosen as the "first" plane and which is chosen as the "second" plane.

The height difference between two planes 6201 may be assigned to a location directly between the cells 6101 corresponding to the two planes 6201. For example, a height difference between the planes 6201 corresponding to cells 6101D and 6101E (see FIG. 6B) may be assigned to the location at point DE. Accordingly, because the height difference between the planes 6201 corresponding to the cells 6101D and 6101E does not correspond to the centroid of the plane 6201 corresponding to cell 6101E, a correction may be applied for determining the height difference to assign to cell 6101E corresponding to the height difference between the planes 6201 corresponding to cells 6101E and 6101D. In an embodiment, the correction may be applied by averaging the height difference assigned to the point DE with the height difference assigned to the point EF (e.g., based on the height difference between the plane 6201 corresponding to the cells 6101E and 6101F). The total height gradient for each cell 6101 may be determined as the average of the eight height differences with neighboring cells. The total height gradient for each cell 6101 may be assigned as the value associated with the point at the center of the cell in the height gradient cost map 6200.

In further embodiments, height difference may be determined according to different methods. The height difference may be based on, for example, a height difference between the centroids 6202A/6202B of the planes 6201A/6201B or a height difference (or average height difference) between the plans along the border of the cells 6101 corresponding to the planes 6201. Other height difference computations and definitions may be used without departing from the scope of this disclosure.

The above discussion, with respect to the grid 6100 of FIG. 6B, represents the computation of height gradients at the center point of each cell 6101 in the grid 6100. Because the stride size may be smaller than the kernel size, the number of points for which height gradients are computed may be greater (even significantly greater) than the number of kernels that can be fitted to the grid 6100. For example, for a stride size of 1, any specific point in the 3D point cloud would have an associated height gradient, each determined based on a grid of kernel sized cells 6101 wherein the specific point is the center of one of the kernel sized cells 6101. For a stride size of 2, every other point would have an associated height gradient.

Thus, the height gradient cost map 6200 may include a series of values representing a height gradient of points (in some embodiments, all points) in the 3D point cloud with respect to neighboring points in the 3D point cloud. As discussed above, the points in the height gradient cost map 6200 may be those points in the 3D point cloud image information 5700 that are separated by a stride. For each point in the height gradient cost map 6200 that is assigned a value, that value is computed based on a plane 6201 with a 2D projection that is the size the of the kernel and that plane's relationship with neighboring planes 6201.

In embodiments, computation of the height gradient cost map 6200 may be eased or optimized by reusing height difference values between two planes 6201. For example, in some embodiments, as discussed above, the computation of height differences from a first plane 6201 to a second plane 6201 may result in an identical value to computation of a height difference between a second plane 6201 and a first plane 6201. Accordingly, it may only be required to compute the height difference between two planes 6201 a single time, permitting the total number of height gradient calculations to be reduced by approximately 50%.

In embodiments, a distance threshold parameter may be used in determining the height differences. The distance threshold parameter may be a threshold beyond which any height difference is assigned a maximum value. If the height difference between two planes exceeds the distance threshold, than that height difference may be set as a predetermined value (e.g., the distance threshold, in some embodiments). Using the distance threshold may reduce the weight of a large height difference between two planes when computing the total height gradient. In embodiments, a distance threshold parameter may also be used to threshold a height gradient assigned to a cell 6101. After averaging the height differences with neighboring cells, the distance threshold may be applied to alter the determined height gradient to a predetermined value if it exceeds the distance threshold.

Figure 6G:
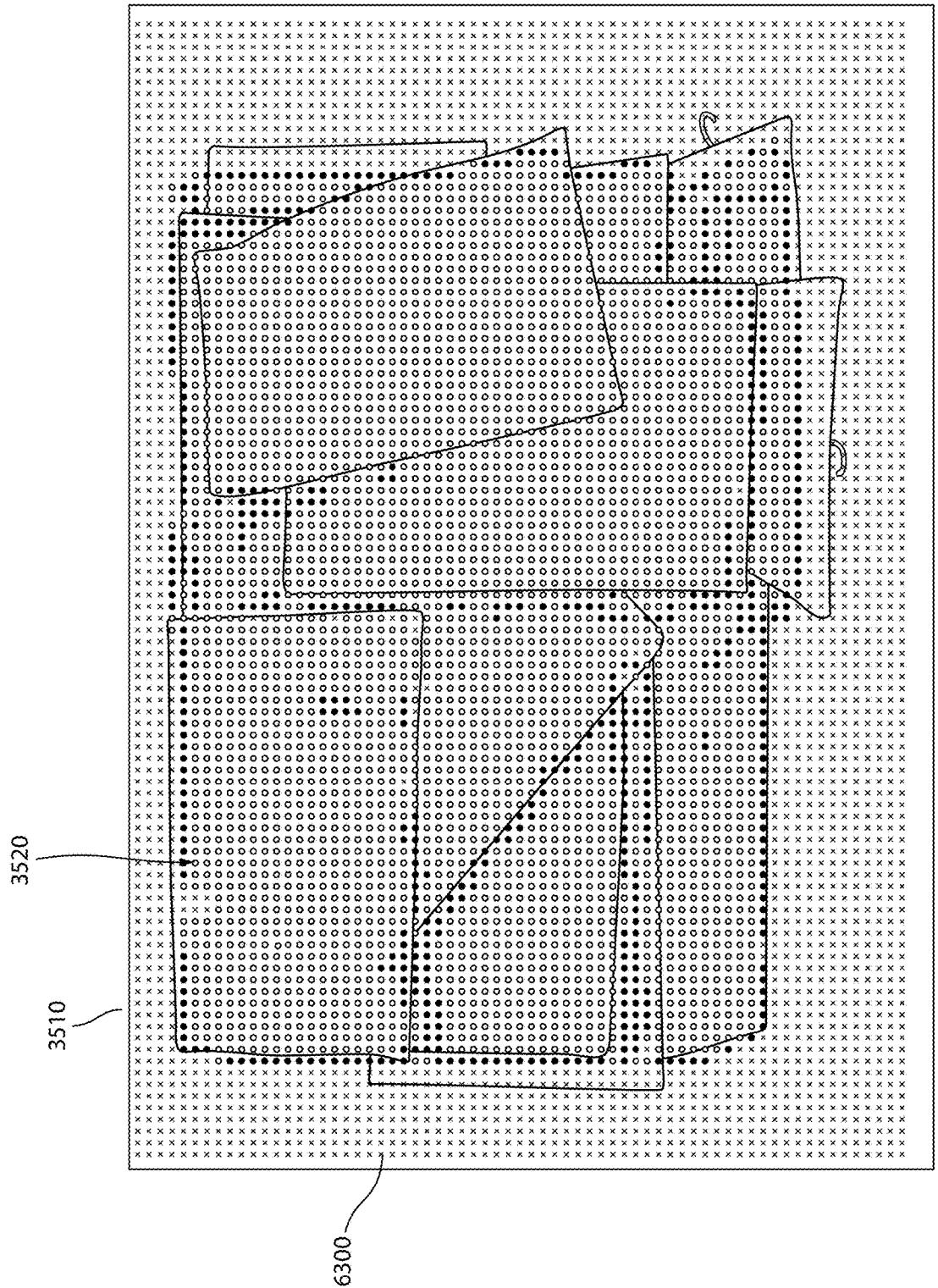
FIG. 6G provides an example of a normal differences cost map consistent with embodiments hereof.

In an operation 6008 of a surface cost map generation method 6000, normal differences may be calculated. FIG. 6G illustrates the normal differences cost map 6300 overlaid on a representation of the source container 3510 containing the objects 3520. Referring now to FIG. 6D, the differences between the normals 6203 of each plane 6201 and its neighboring planes 6201 may be determined. Normal differences may be determined as the dot product of the normal 6203 of one plane 6201 with the normal 6203 of a neighboring plane 6201. Thus, each plane 6201 may have eight different computed normal differences. The mean of these normal differences may be taken and assigned to the cell 6101 (e.g., the point at the center of the cell 6101) associated with the plane 6201. In this way, a normal differences cost map 6300 may be generated wherein each point within the surface cost map is assigned a normal difference indicative of angular differences between the plane 6201 centered at the point and the neighboring planes 6201. As shown in FIG. 6G, open circles illustrate portions of low normal differences, closed circles illustrate portions of larger normal differences, and crosses illustrate portions that cannot be identified as objects, for example due to unreliable detection or detection of the source container 3510. For illustration purposes, the values are shown as high and low, when in practice the values may span a range of potential values. It can be seen that normal differences at the boundaries of objects 3520 are larger than normal differences across central portions of the objects 3520.

In embodiments, a normal threshold parameter may be used in determining the normal differences. The normal threshold parameter may be a threshold beyond which any height difference is assigned a maximum value. If the normal difference between two planes exceeds the normal threshold, than that normal difference may be set as a predetermined value (e.g., the normal threshold, in some embodiments). Using the normal threshold may reduce the weight of a large normal difference between two planes when computing the average normal difference.

Figure 6H:
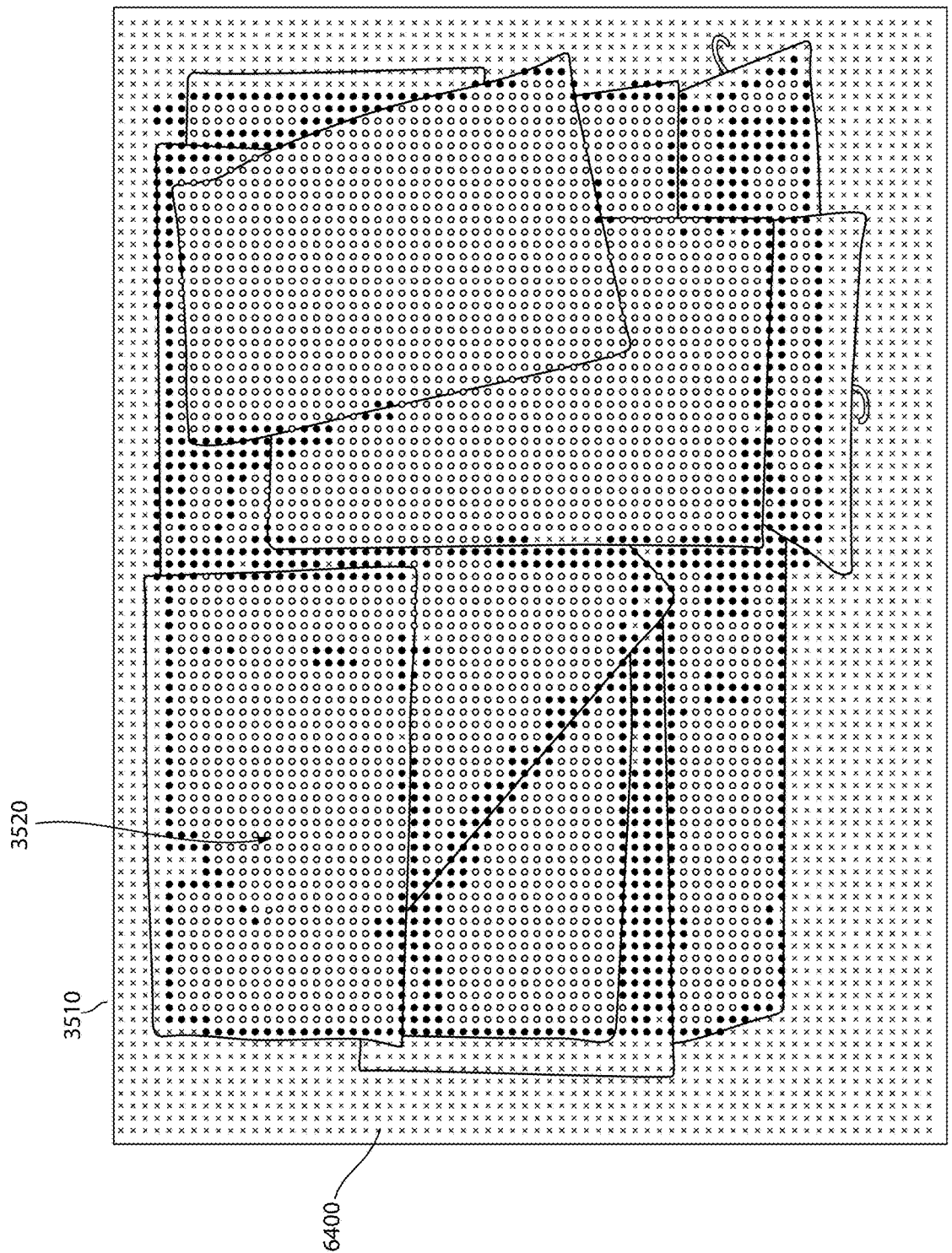
FIG. 6H provides an example of a surface cost map consistent with embodiments hereof.
Figure 6I:
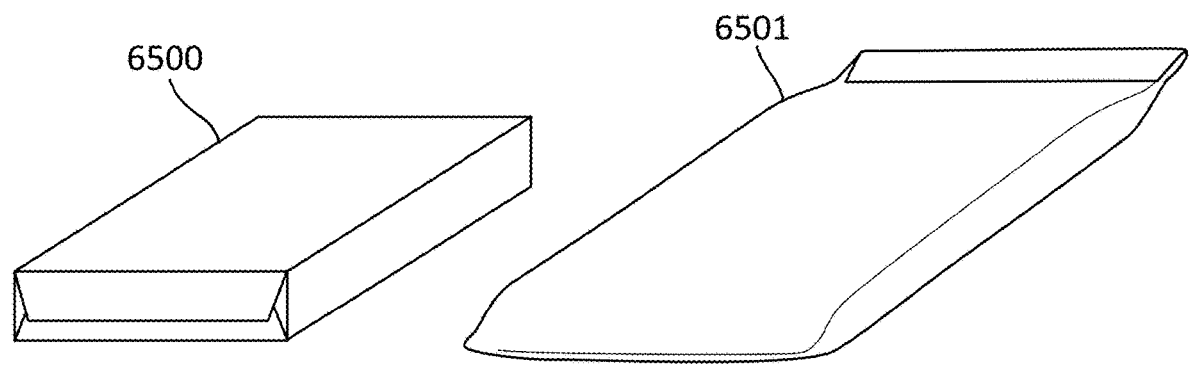
FIG. 6I provides an example of a box like object and a pouch like object consistent with embodiments hereof.

In an operation 6010 of a surface cost map generation method 6000, the surface cost map may be generated. FIG. 6H illustrates the surface cost map 6400 overlaid on a representation of the source container 3510 containing the objects 3520. The surface cost map 6400 may be generated as a mathematical combination of the height gradient cost map 6200 and the normal difference cost map 6300. In embodiments, the computer system may combine the height difference values and the normal difference values according to a filtering operation, such as an average filter or a sobel filter. In embodiments, the values in the height gradient cost map 6200 and the normal difference cost map 6300 may be normalized and combined. In embodiments, a weighting factor may be applied to either the height difference values or the normal difference values to control how strongly the surface cost map depends on the respective difference values. The weighting factor may be a normal weight factor, for example, a factor that is multiplied by the normalized normal differences to determine how strongly final surface cost map 6400 should be determined by the normal differences or how strongly the final surface cost map 6400 should be determined by the height differences. Selection of the normal weight factor may be performed, for example, according an expected object type, as discussed below. As shown in FIG. 6H, open circles illustrate portions of low surface cost map values, closed circles illustrate portions of larger surface cost map values, and crosses illustrate portions that cannot be identified as objects, for example due to unreliable detection or detection of the source container 3510. For illustration purposes, the values are shown as high and low, when in practice the values may span a range of potential values. It can be seen that surface cost map values at the boundaries of objects 3520 are larger than surface cost map values across central portions of the objects 3520.

As discussed above, surface cost map generation may be performed based on one or more parameters, including kernel size, stride size, distance threshold, normal threshold, and normal weight.

Kernel size and stride size may be selected or determined according to various factors to achieve various results. In embodiments, a smaller kernel size may be selected to provide a result that is more sensitive to small changes in the 3D point cloud, although the smaller kernel size may also be more sensitive to noise. In embodiments, a larger kernel size may be selected to smooth smaller variations in the 3D point cloud, whether the variations be due to noise or to variations in the actual objects that are imaged. In embodiments, a small stride size may be selected to provide a high resolution, detailed surface cost map, although such a small stride size may require increased computing power and/or increased processing time. In embodiments, a larger stride size may result in down sampling of the 3D point cloud, which may provide a faster result and/or lower use of computing resources, at the expense of some detail. In embodiments, a stride size selected less than 0.5, less than 0.4, and/or less than 0.3 of the kernel size may provide an appropriate amount of detail while still providing a faster result. In embodiments, a stride size of half or approximately half of the kernel size may provide a balance between reducing resolution, speed, and level of detail. It may be understood that selection of kernel and stride size may be influenced by the availability of processing or computing power. Increased computation resources may permit the generation of a more detailed surface cost map without a disadvantageous increase in processing time.

In embodiments, the composition of the objects in the object source may influence the optimum values for kernel size and stride size. For example, a collection of objects having small and sharp discontinuities may benefit from a smaller stride size to capture the finer detail. In another example, a collection of objects having a rough but deformable surface may benefit from a larger kernel size to provide greater smoothing. In another example, if the kernel size is large compared to the object size (e.g., the object size is only 2, 3, or 4 times the kernel size) the surface cost map may include few smooth areas because many of the kernels covering an object will also overlap the edge of the object where there are discontinuities. In another example, objects having smooth curved surfaces of small radius may result in incorrectly high costs if the kernel size and stride size are too larger.

In embodiments, the composition of the objects in the object source may also influence optimum values for distance threshold, normal threshold, and normal weight factor. For example, referring now to FIG. 6I, a box like object 6500 and a pouch like object 6501 (which are examples of objects 3520) may be considered. The center portions of the objects 6500/6501 have smoothness properties that describe the general or bulk smoothness of the objects 6500/6501, while the edges of the objects 6500/6501 describe the transition between the objects 6500/6501. Thus, it is advantageous to select parameters that may take advantage of this.

For example, a distance threshold may be selected according to an object size. Any detected height difference that is equal to or larger than the distance threshold may be set to the maximum value for height difference. Thus, the height difference at the edge of an object 6500/6501 may have the same influence on the surface cost map 6400 regardless of whether the object is at the top of a stack of several objects or just one object. A larger height drop off at the edge of an object 6500/6501 (e.g., because the object 6500/6501 is stacked on other objects 6500/6501) does not provide any additional information to identify the object transition.

In another example, a normal threshold may be selected according to an object shape. For example, for a box like object 6500, it is expected that the normals will have low variation. In such a case, the normal threshold may be selected as a value larger than an expected variation due to noise. Thus, any normal differences that are identified as larger than an expected normal difference due to noise difference is set to a maximum value in the normal differences cost map. In a box like object 6500, because all of the object surfaces are likely to be planes, any variation in the normals that may be identified as real (because it exceeds a noise value) may represent a discontinuity between objects 6500. For such objects 6500, a normal weight factor may also be selected so as to provide approximately equal weight to the normal differences and to the height differences. In another example, pouch like objects, such as object 6501, may have portions with significant changes in angle without representing an object discontinuity. In such a situation, a normal weight factor may be selected to provide a greater weight to height differences, because differences in normals provide less information about object discontinuity. In still another example, a deformable bag may be expected to have large changes in normals and the normal weight factor may be selected to provide a much greater weight to height differences, because differences in normals provide very little information about object discontinuity.

As discussed above, different parameters may provide better or worse results in surface cost map generation according to the object types and object sizes in the source container. In embodiments, surface cost map generation parameters may be selected manually, for example according to expected types and sizes of objects in a source container. In further embodiments, parameter selection may be automated and may be performed based on, for example, obtained 2D image information 2600 and/or obtained 3D image information 5700. As discussed above, object detection (including, for example, object registration) may be performed on the obtained 2D image information 2600 and/or obtained 3D image information 5700 to identify the size, shape, and/or type of objects in a source container. According to the object detection (e.g., object registration) surface cost map generation parameters, including kernel size, stride size, distance threshold, normal threshold, and normal weight factor may be automatically selected.

In embodiments that include source containers having multiple different types of objects, distance threshold, normal threshold, and normal weight factor may be adjusted within the surface cost map for the areas associated with the different types of registered objects.

Returning now to FIG. 4, in an operation 4006, the method 4000 includes segmentation of the image information (e.g., the 2D image information 2600 and/or the 3D image information 5700). Segmentation may be performed according to the surface cost map 6400 generated according to methods described above or by any suitable method. Segmenting the image information may provide a plurality of image segments that use the values of the surface cost map 6400 to identify individual objects within the scene. An image segmentation process according to embodiments hereof is described with respect to FIGS. 7A-7E.

Figure 7A:
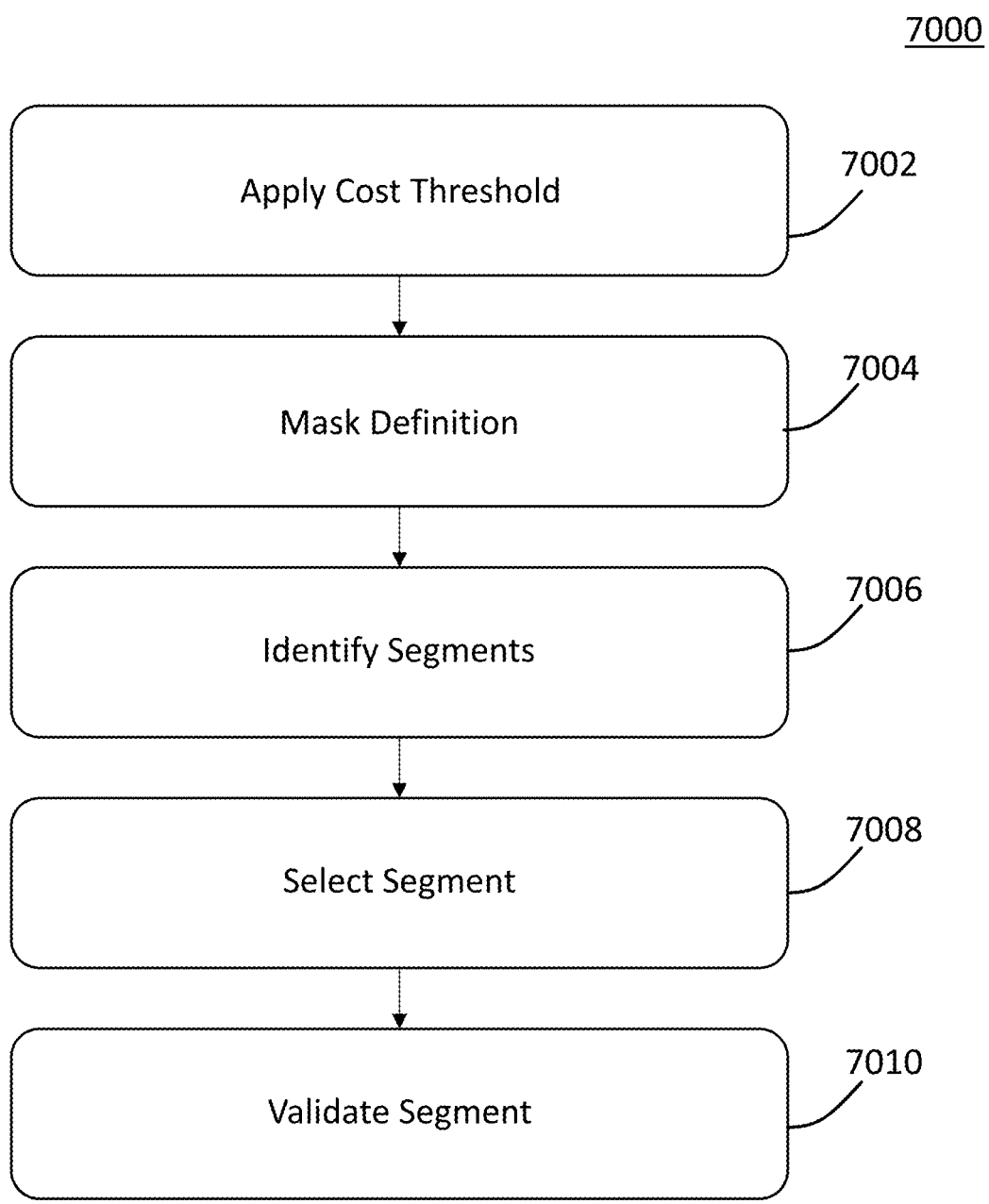
FIG. 7A provides an example of a segmentation method consistent with embodiments hereof.
Figure 7B:
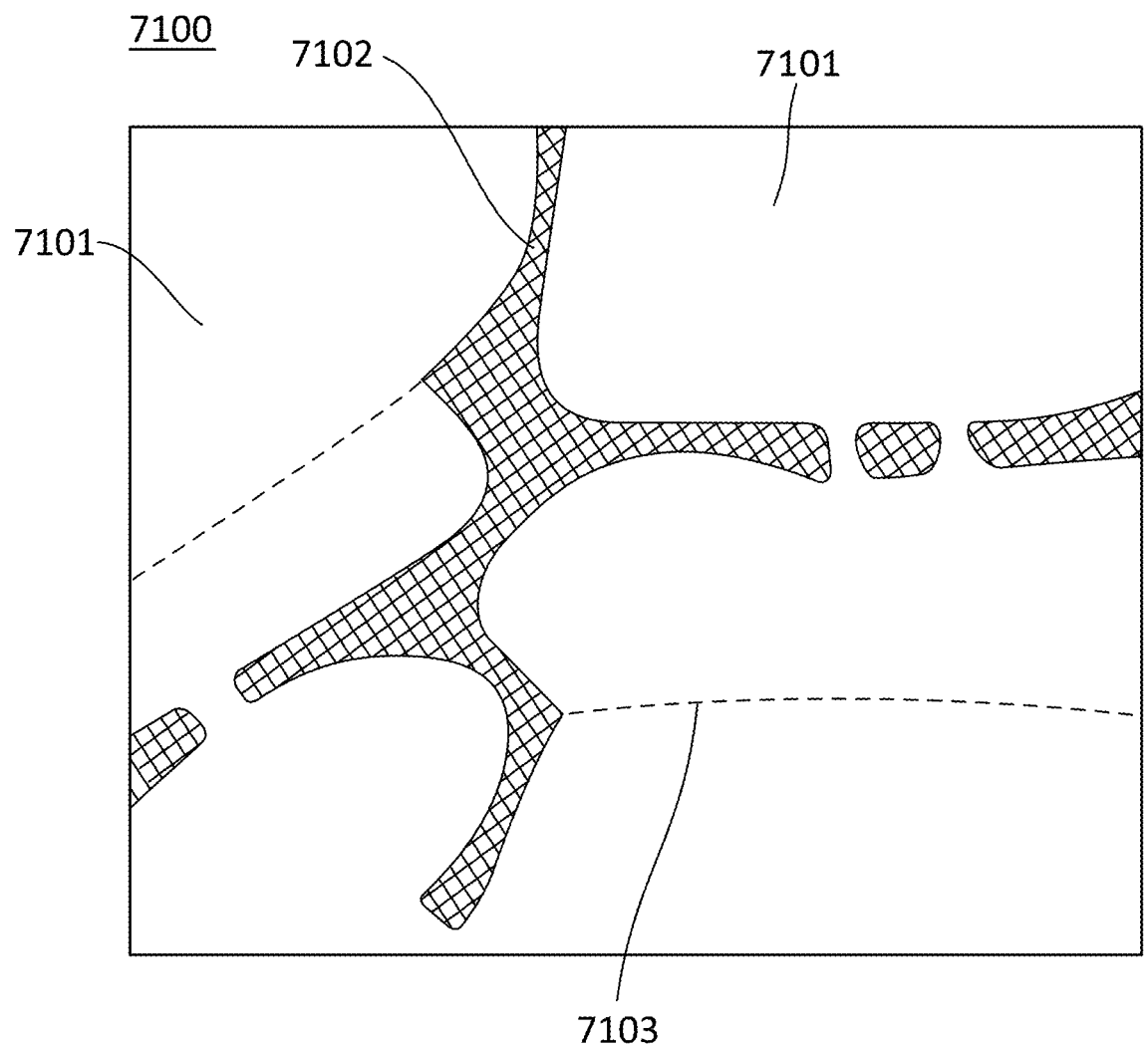
FIGS. 7B-7E provide examples of aspects of a segmentation method consistent with embodiments hereof.

In an operation 7002 of an image segmentation method 7000 may include applying a cost threshold to perform an initial segmentation of the surface cost map. Applying the cost threshold generates threshold borders 7102 between object portions 7101 in a thresholded mask 7100, as shown in FIG. 7B. The threshold borders 7102 represent regions having a surface cost map value exceeding the threshold while the object portions 7101 represent regions having a surface cost map value not exceeding the threshold. The threshold borders 7102 may thus be represented by "false" values in the threshold mask 7100 while the object portions 7101 are represented as "true" values. The assignment of "false" and "true" values is by convention only, and any suitable distinction may be applied. The object portions 7101 represent a first estimation of object surfaces while the threshold borders 7102 represent a first estimation of object boundaries or discontinuities. The object borders 7103 represent the actual object boundaries and are provided for purposes of comparison.

In an operation 7004 of the image segmentation method 7000, the thresholded mask 7100 may be further defined in a mask definition operation. The mask definition operation may include one or more of connected components analysis and mask erosion, as explained with respect to FIG. 7C. The thresholded mask 7100 may be further defined to generate the defined mask 7200.

Generating the defined mask 7200 may include mask erosion performed on the thresholded mask 7100. Mask erosion is an operation that reduces or erodes the boundaries of a mask according to a structuring element. The structuring element may represent, for example, an N×N group of pixels or points with an output pixel/point, which may be located at a center of the structuring element. When placed over the mask, if every point in the mask that coincides with a point in structuring element is true, then the output point of the structuring element in the eroded mask is set to be true. Thus, for a point in the eroded mask to be true, then every surrounding point in the original mask up to the size of the structuring element must also be true. Erosion thus has the effect of eliminating one or more layers of points at the edges of the mask and smoothing any irregularities in the mask. In an example, mask erosion may be performed on the thresholded mask 7100 using a structuring element that is half of a minimum pickable region size (e.g. the smallest region size that may be grasped by a robotic arm, which may be, for example, the size required by a suction gripper to achieve a secure grip). This erosion operation may thus serve to disconnect any portions of the mask that are smaller than the minimum pickable region size.

Figure 7C:
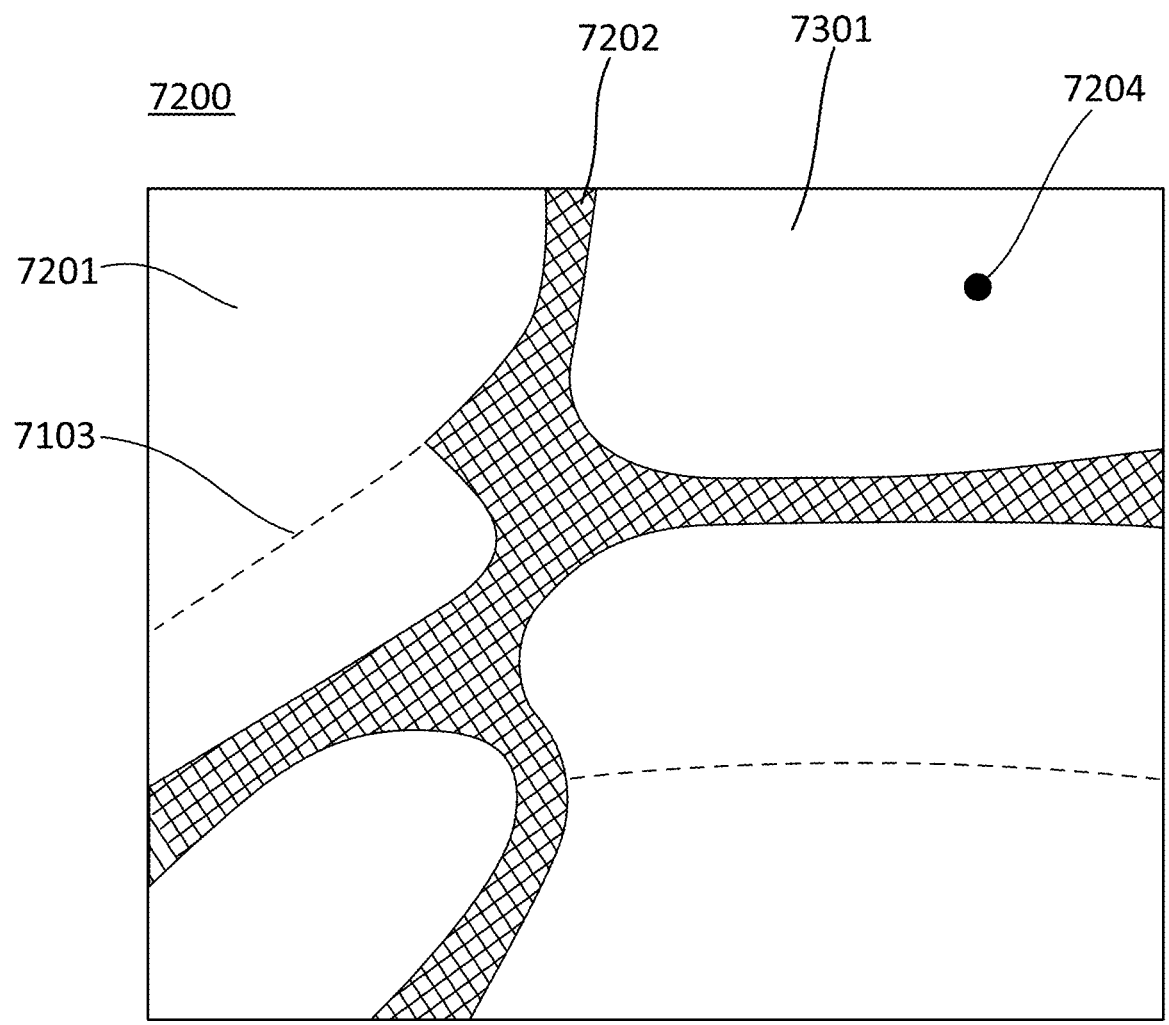

In an operation 7006 of the image segmentation method 7000, object regions may be identified within the defined cost mask 7200. Referring still to FIG. 7C, connected components analysis may be performed on the defined cost mask 7200 to identify object regions 7201 within the defined cost mask 7200. The object regions 7201 may represent more refined estimations of object locations and boundaries than the object portions 7101 previously discussed.

Figure 7D:
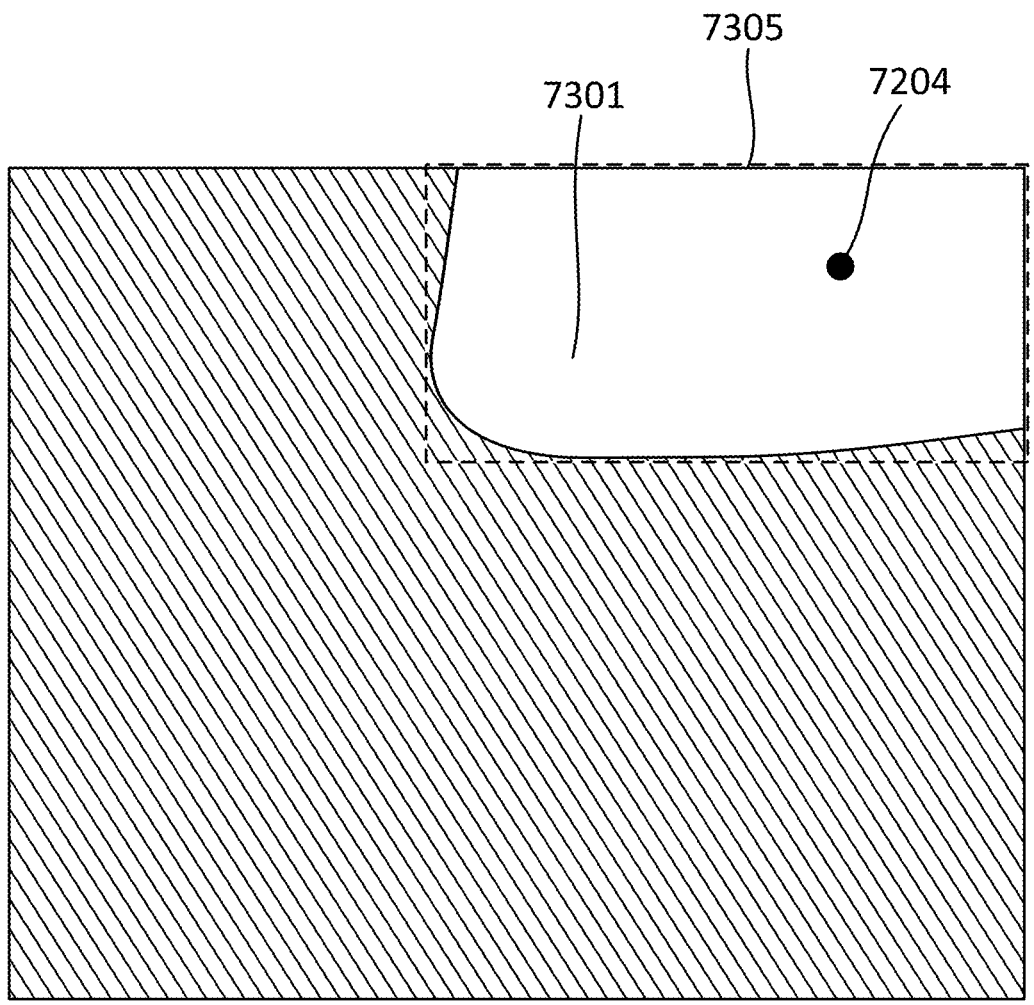

In an operation 7008 of the image segmentation method 7000, an image segment 7301 from the object regions 7201 may be selected and further defined. Referring now to FIGS. 7C and 7D, the image segment 7301 may be selected as the object region 7201 having a seed 7204 located therein. The seed 7204 may be the point the surface cost map having the lowest cost (e.g., the smoothest point least likely to represent a boundary or discontinuity). A segment map 7300 (FIG. 7D) containing the image segment 7301 may be generated by removing all object regions 7201 that do not include the seed. The image segment 7301 may then be dilated with a structured element corresponding to half of the minimum pickable region size. Dilation is an operation that is opposite to erosion. During dilation, the output pixel/point of the structured element becomes an input point. When overlaid on the segment map 7300, if the point on the segment map 7300 corresponding to the input point of the structured element is true, then all points in the segment map 7300 corresponding to the structured element are set as true. Dilation has the effect of expanding the boundaries of the image segment 7301 by an amount that corresponds to a size of the structured element.

In an operation 7010 of the image segmentation method 7000, the image segment 7301 may be validated. Validation of the image segment 7301 may be performed to determine whether the identified image segment 7301 represents a viable object from among the plurality of objects. A bounding box 7305 (e.g., a square or rectangular box) may be fitted around the identified image segment 7301. The bounding box 7305 may then be compared to a maximum object candidate size and a minimum object candidate size. The maximum object candidate size and the minimum object candidate size represent the maximum and minimum potential object sizes as determined during the object detection process. If the bounding box is larger than a maximum object candidate size or smaller than a minimum object candidate size, the image segment 7301 may be determined as invalid, which requires an iteration of operations 7002, 7004, 7006, and 7008. If the bounding box is larger than the maximum object candidate size, the iteration may be performed with a decreased cost threshold. If the bounding box is smaller than the minimum object candidate size, the iteration may be performed with an increased cost threshold.

In embodiments, the bounding box may also be compared to a desired minimum pickable region size. A minimum pickable region size may correspond to a smallest possible region size that is pickable, for example corresponding to the size of a single suction gripper of a robotic arm. In embodiments, a robotic arm may employ more than one suction gripper, e.g., 2 or 4. A desired minimum pickable region size may be a parameter that corresponds to the size of a region necessary for achieving a selected or desired grip, for example, a region necessary for 2 or 4 suction grippers to achieve a grip. If the bounding box is smaller than the desired minimum pickable region size, the operations 7002, 7004, 7006, and 7008 may be iterated with an increased threshold.

Figure 7E:
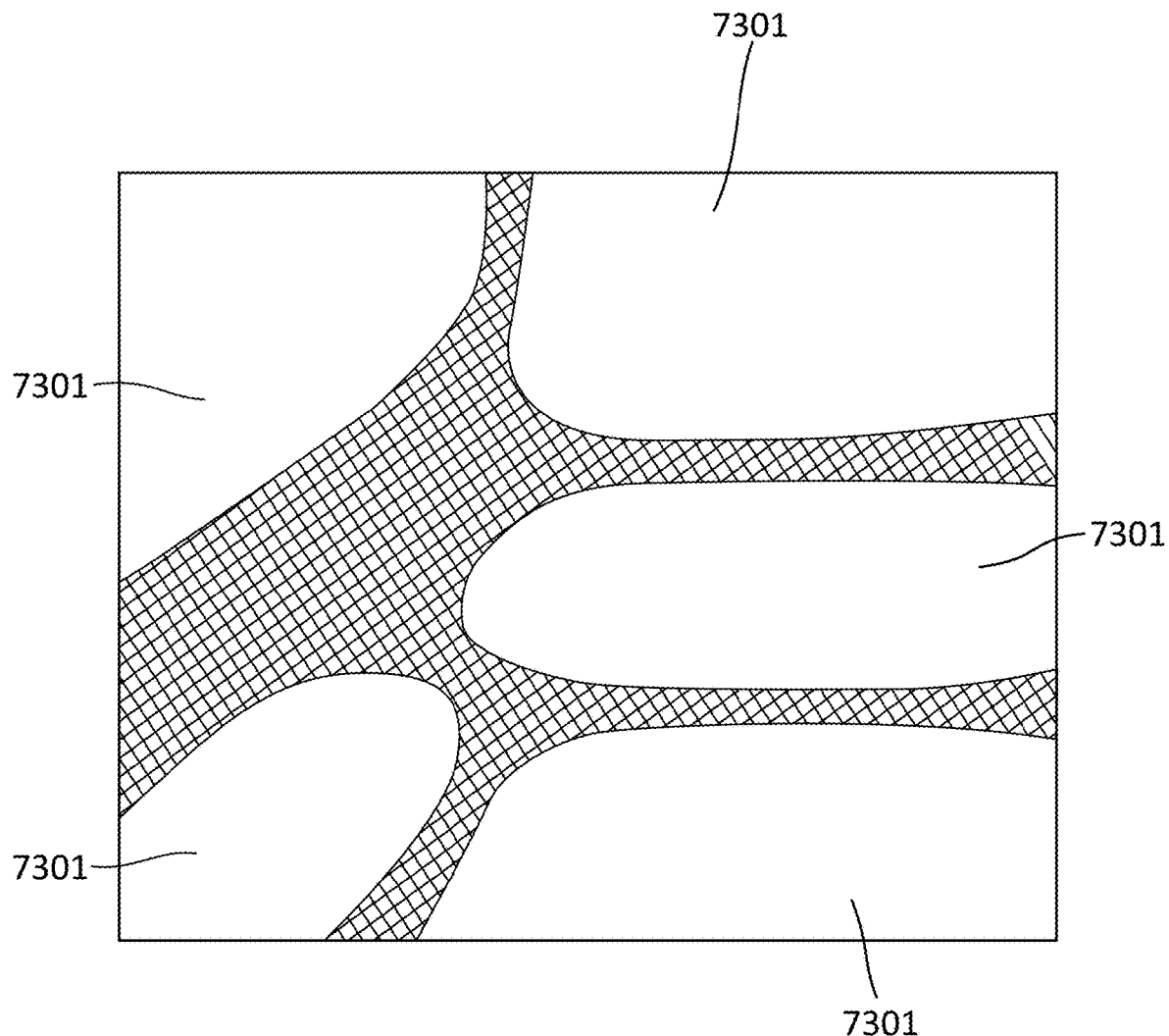

After the image segment 7301 has been validated it may be stored for further analysis as a pickable region. The image segment 7301 may then be removed from the surface cost map 6400 and the operations 7002-7010 may be repeated to identify additional image segments 7301. In embodiments, prior to repeating the operations 7002-7010, the cost threshold may be increased. The method 7000 may be repeated and the cost threshold may be increased until no further segments are detected or identified. FIG. 7E illustrates a collection of image segments 7301 identified from the surface cost map 6400. In embodiments, the identified image segments 7301 may be designated as pickable regions. In embodiments, the identified image segments 7301 may be further analyzed to determine pickable regions therein.

In an operation 4008, the method 4000 includes generation of a detection mask. A detection mask may be generated to refine or further define potential pickable regions of objects corresponding to the image segments 7301 determined from the image segmentation operation 4006.

Figure 8A:
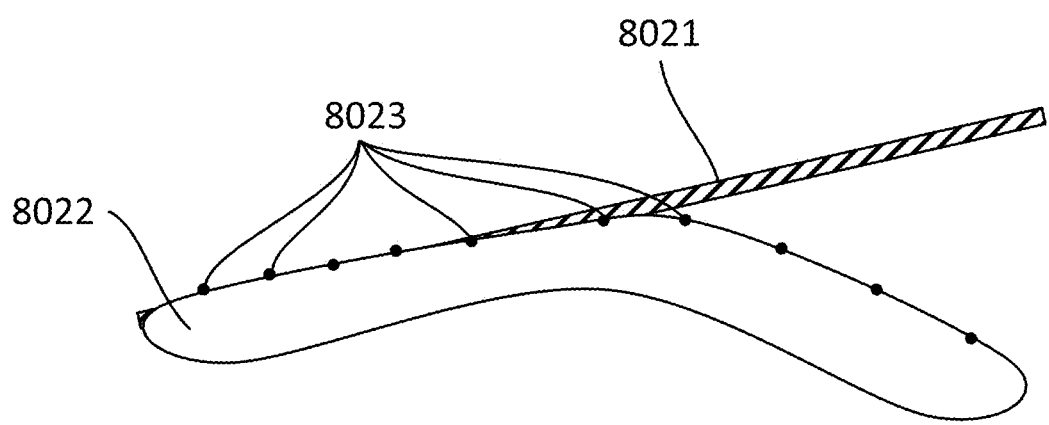
FIGS. 8A and 8B provide examples of aspects of detection mask information generation consistent with embodiments hereof.

For example, as shown in FIG. 8A, because the bounding box of operation 7010 is a two dimensional construct, it may not accurately correspond to the actual heights of the points on the object. In FIG. 8A, the bounding box 8021 has been fitted to the object 8022. However, the actual points 8023 on the surface of the object 8022 do not all fall within the bounding box 8021, due to the deformable nature of the object 8022. Accordingly, in the operation 4008, detection mask information may be generated to identify portions of an object within a bounding box that are more or less suitable for object picking.

Figure 8B:
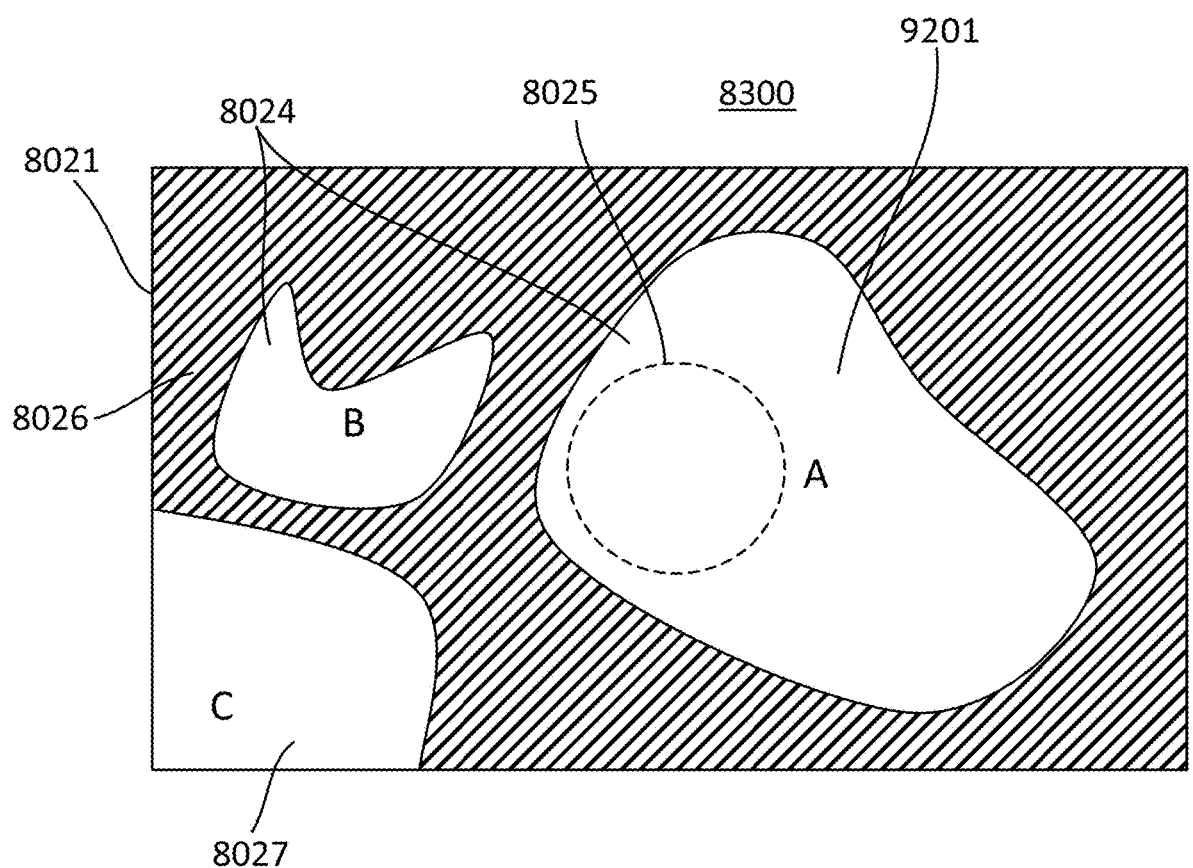

FIG. 8B illustrates detection mask information 8300. The detection mask information 8300 may include information about the objects within the bounding box 8021 (e.g., the bounding box for an image segment 7301 generated during operation 7010). The detection mask information 8300 includes identified areas 8024 and 8027 and unidentified area 8026. The identified areas 8024 and 8027 may include detected areas 8024 that include detected and unoccluded areas as well as occluded areas 8027. Occluded areas 8027 may not be safe or useful for object picking while detected areas 8024 may be safe for picking. Unidentified area 8026 may include regions which are unidentified for either occlusion or picking and generally were not used or relied upon for detection. Also illustrated in FIG. 8B is a minimum pickable region 8025. As shown, it can be seen that the detected area 8024 labeled "B" is not large enough to accommodate the minimum pickable region 8025. The detection mask information 8300 may thus be used in conjunction with the above described image segmentation techniques to identify pickable regions of objects.

In an operation 4010, the method 4000 may include determining a safety volume for use in a motion planning operation. The safety volume may represent a volume which a selected object for picking may occupy. The safety volume is selected to reduce the likelihood that the selected object, once picked, will collide with something else within the object handling environment.

Figure 9A:
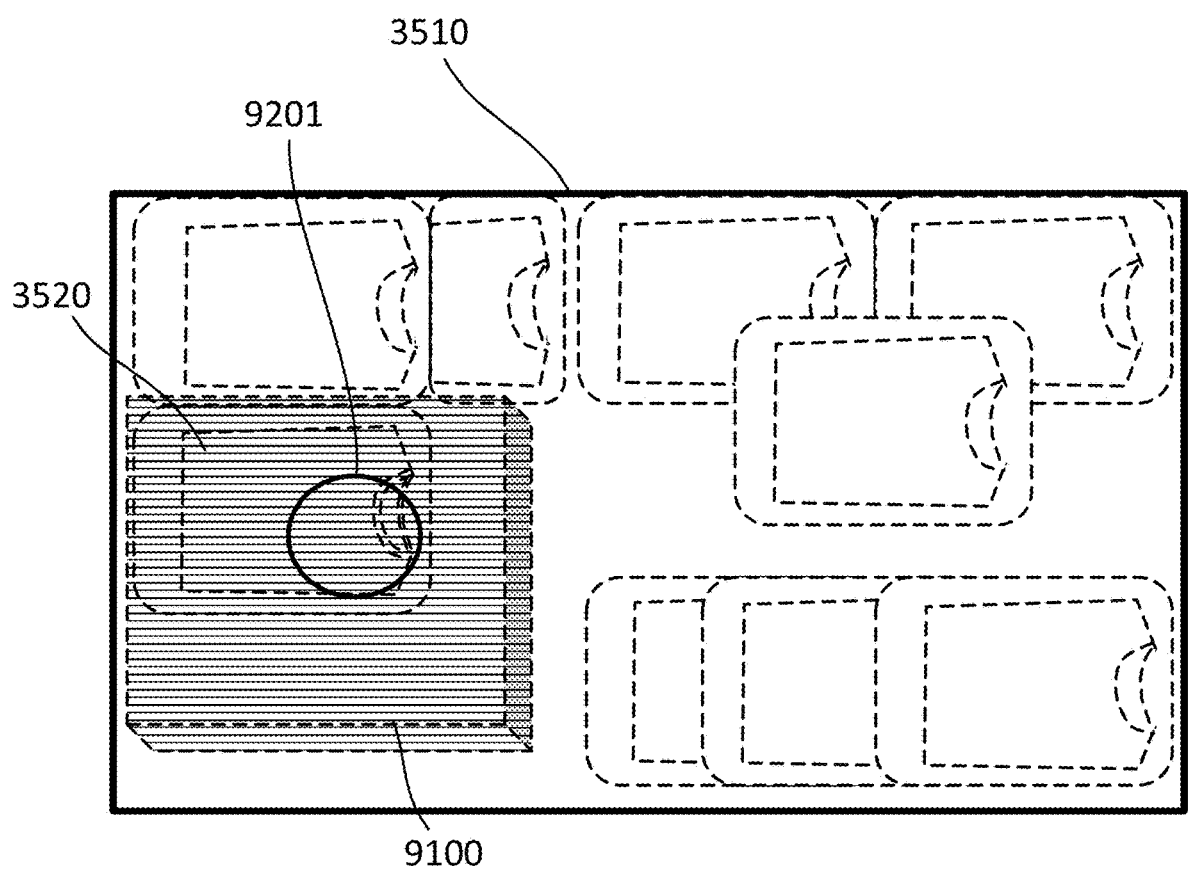
FIGS. 9A and 9B provide examples of aspects of safety volume generation consistent with embodiments hereof.

Referring now to FIG. 9A, a safety volume 9100 is provided around the pickable region 9201 designated as the pickable region of the object 3520. The safety volume may be determined as having twice the size of the difference between the designated pickable region 9201 for picking and the expected object size. This safety volume size thus creates a volume around the pickable region 9201 that may provide a margin of error in the potential dimensions of the object, for example, if the pickable region 9201 is not located at a center of the object 3520 to be picked. The size of the safety volume 9100 may then be modified as follows.

Figure 9B:
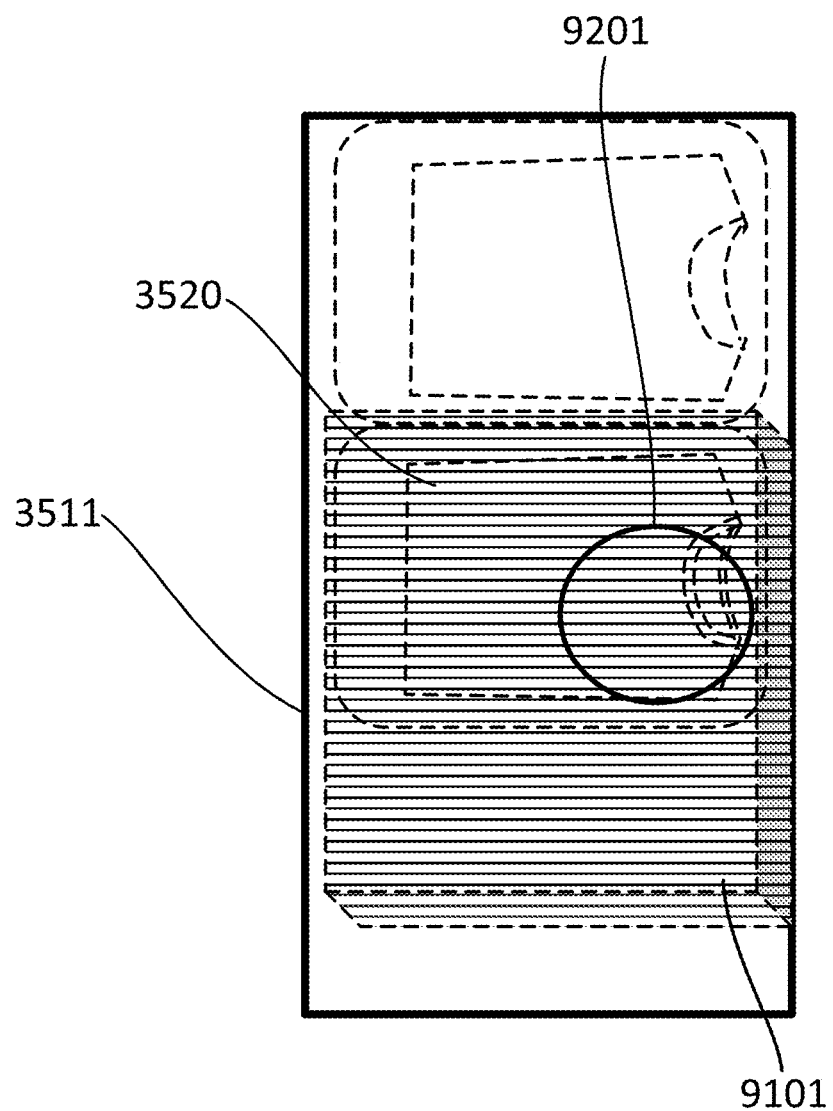

First, the safety volume 9100 is compared to the 3D point cloud. If the 3D point cloud does not support the safety volume 9100 size, (e.g., the safety volume 9100 is too large and would extend past the boundaries of the 3D point cloud, which correspond to the boundaries of the source container 3510), the size of the safety volume 9100 may be reduced to a size that is supported by the 3D point cloud. The safety volume 9100 may then be aligned with the edges of the 3D point cloud. FIG. 9B illustrates a situation in which the safety volume 9100 is reduced to the safety volume 9101 because of the boundaries of the safety volume 9100 would extend outside of the 3D point cloud associated with the source container 3511.

The safety volume 9100/9101 may further be reduced if it is larger than a maximum allowable size as designated by a destination container. If the destination container, for example, is smaller than a source container, it is possible for the safety volume 9100/9101 to be too large for the destination container. The safety volume 9100/9101 may thus be reduced or adjusted accordingly. In embodiments, where a safety volume 9100/9101 is larger than a destination container and cannot be adjusted to a size smaller than a destination container, if it is known that the object 3520 will fit into the destination container, a motion plan may be generated that takes this uncertainty into account.

The safety volume 9100/9101 may further be adjusted if the detection bounding box of operation 7010 sticks out of the safety volume 9100/9101. This may occur, for example, due shrinking or realigning the safety volume as described above or if the bounding box is arranged in an inconvenient way with respect to the pickable region 9201 that forms the basis of the safety volume 9100/9101. In embodiments, to address this issue, the safety volume 9100/9101 may be shifted to include the bounding box or the bounding box may be shifted and aligned to the safety volume 9100/9101.

In an operation 4012, the method 4000 includes outputting a pickable region detection result. The pickable region detection result may include any or all of the information generated in the operations 4002-4010, including, for example, the identified image segments 7301, their associated bounding boxes 7305, identified pickable regions 9201, and safety volumes 9100/9101. The pickable region detection result may include pickable region detection result information about any or all of the detected objects 3520 within the source container 3510.

In an operation 4014, the method 4000 may include generating and/or outputting a motion plan according to the pickable region detection result. The motion plan may include robot instructions to follow a trajectory, grasp or pick an object 3520 by its identified pickable region 9201, and transfer the object 3520 to a destination container, while accounting for potential collisions based on the determined safety volume 9100/9101 of the object 3520.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present disclosure is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

Further embodiments may include:

Embodiment 1 is a computing system comprising: a control system configured to communicate with a robot having a robot arm that includes or is attached to an end effector apparatus and to communicate with a camera; at least one processing circuit configured, when the robot is in an object handling environment including a source of objects for transfer to a destination within the object handling environment, to: obtaining image information of the objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

Embodiment 2 is the system of embodiment 1, wherein the surface cost map is representative of a smoothness of the one or more selected objects.

Embodiment 3 is the system of embodiments 1 or 2, wherein the image information includes three dimensional information, the method further comprising generating the surface cost map according to height gradients and normal differences between defined cells of the image information.

Embodiment 4 is the system of any of embodiments 1 to 3, wherein the at least one processing circuit is further configured for generating the surface cost map according to surface cost map parameters.

Embodiment 5 is the system of any of embodiments 1 to 4, wherein the at least one processing circuit is further configured for: registering the one or more objects based on the image information to create object registration information; and determining the surface cost map parameters according to the object registration information.

Embodiment 6 is the system of any of embodiments 1 to 5, wherein the at least one processing circuit is further configured for generating detection mask information indicating the one or more pickable regions of the image segments, the detection mask information including detected areas and occluded areas within the one or more image segments.

Embodiment 7 is the system of any of embodiments 1 to 6, wherein segmenting the surface cost map includes: applying a cost threshold to the surface cost map to generate a thresholded mask; eroding the thresholded mask to generate an eroded mask; and applying a connected components analysis to the eroded mask to identify a first image segment.

Embodiment 8 is the system of any of embodiments 1 to 7, wherein segmenting the surface cost map further includes: removing the first image segment from surface cost map; applying a second cost threshold to a remaining portion of the surface cost map to generate a second thresholded mask; eroding the second thresholded mask to generate a second eroded mask; and applying the connected components analysis to the second eroded mask to identify a second image segment.

Embodiment 9 is the system of any of embodiments 1 to 8, wherein generating the pickable region detection result further includes generating a safety volume around the one or more pickable regions, the safety volume indicating an estimated remaining portion of the one or more selected objects.

Embodiment 10 is a method of object transfer comprising performed by a control system having at least one processing circuit and being configured to communicate with a robot having a robot arm that includes or is attached to an end effector apparatus and to communicate with a camera, the method comprising: obtaining image information of one or more objects contained within a source of objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

Embodiment 11 is the method of embodiment 10, wherein the surface cost map is representative of a smoothness of the one or more selected objects.

Embodiment 12 is the method of embodiment 10 or 11, wherein the image information includes three dimensional information, the method further comprising generating the surface cost map according to height gradients and normal differences between defined cells of the image information.

Embodiment 13 is the method of any of embodiments 10 to 12, further comprising generating the surface cost map according to surface cost map parameters.

Embodiment 14 is the method of any of embodiments 10 to 13, further comprising: registering the one or more objects based on the image information to create object registration information; and determining the surface cost map parameters according to the object registration information.

Embodiment 15 is the method of any of embodiments 10 to 14, further comprising generating detection mask information indicating the one or more pickable regions of the image segments, the detection mask information including detected areas and occluded areas within the one or more image segments.

Embodiment 16 is the method of any of embodiments 10 to 15, wherein segmenting the surface cost map includes: applying a cost threshold to the surface cost map to generate a thresholded mask; eroding the thresholded mask to generate an eroded mask; and applying a connected components analysis to the eroded mask to identify a first image segment.

Embodiment 17 is the method of any of embodiments 10 to 16, wherein segmenting the surface cost map further includes: removing the first image segment from surface cost map; applying a second cost threshold to a remaining portion of the surface cost map to generate a second thresholded mask; eroding the second thresholded mask to generate a second eroded mask; and applying the connected components analysis to the second eroded mask to identify a second image segment.

Embodiment 18 is the method of any of embodiments 10 to 17, wherein generating the pickable region detection result further includes generating a safety volume around the one or more pickable regions, the safety volume indicating an estimated remaining portion of the one or more selected objects.

Embodiment 19 is a non-transitory computer readable medium, configured with executable instructions for object transfer to be performed by a control system having at least one processing circuit and being configured to communicate with a robot having a robot arm that includes or is attached to an end effector apparatus and to communicate with a camera, the instructions being configured for: obtaining image information of one or more objects contained within a source of objects; identifying a pickable region of one or more of selected object from the objects by: generating a surface cost map according to the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

Embodiment 20 is the non-transitory computer readable medium of embodiment 19, wherein the image information includes three dimensional information, the method further comprising generating the surface cost map according to height gradients and normal differences between defined cells of the image information.

The invention claimed is:

1. A method of object transfer comprising performed by a control system having at least one processing circuit and being configured to communicate with a robot having a robot arm that includes or is attached to an end effector apparatus and to communicate with a camera, the method comprising:
obtaining image information of one or more objects contained within a source of objects;
identifying a pickable region of one or more of selected object from the objects by:
generating a surface cost map according to height gradients of the image information,
segmenting the surface cost map to obtain one or more image segments identifying one or more pickable regions corresponding to the one or more selected object; and
generating a pickable region detection result including at least the one or more pickable regions; and
generating a motion plan for a robotic system to transfer the one or more selected objects, the motion plan being based on the pickable region detection result.

2. The method of claim 1, wherein the surface cost map is representative of a smoothness of the one or more selected objects.

3. The method of claim 1, wherein the image information includes three-dimensional information, the method further comprising generating the surface cost map according to the height gradients and normal differences between defined cells of the image information.

4. The method of claim 3, further comprising generating the surface cost map according to surface cost map parameters.

5. The method of claim 4, further comprising:
registering the one or more objects based on the image information to create object registration information; and
determining the surface cost map parameters according to the object registration information.

6. The method of claim 1, further comprising generating detection mask information indicating the one or more pickable regions of the image segments, the detection mask information including detected areas and occluded areas within the one or more image segments.

7. The method of claim 1, wherein segmenting the surface cost map includes:
applying a cost threshold to the surface cost map to generate a thresholded mask;
eroding the thresholded mask to generate an eroded mask; and
applying a connected components analysis to the eroded mask to identify a first image segment.

8. The method of claim 7, wherein segmenting the surface cost map further includes:
removing the first image segment from surface cost map;
applying a second cost threshold to a remaining portion of the surface cost map to generate a second thresholded mask;
eroding the second thresholded mask to generate a second eroded mask; and
applying the connected components analysis to the second eroded mask to identify a second image segment.

9. The method of claim 1, wherein generating the pickable region detection result further includes
generating a safety volume around the one or more pickable regions, the safety volume indicating an estimated remaining portion of the one or more selected objects.

10. A non-transitory computer readable medium, configured with executable instructions for object transfer to be performed by a control system having at least one processing circuit and being configured to communicate with a robot having a robot arm that includes or is attached to an end effector apparatus and to communicate with a camera, the instructions being configured for:

obtaining image information of one or more objects contained within a source of objects;

identifying a pickable region of one or more of selected object from the objects by:

generating a surface cost map according to height gradients of the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

11. The non-transitory computer readable medium of claim 10, wherein the image information includes three-dimensional information, the instructions being further configured for generating the surface cost map according to the height gradients and normal differences between defined cells of the image information.

12. A computing system comprising:

a control system configured to communicate with a robot having a robot arm that includes or is attached to an end effector apparatus and to communicate with a camera;

at least one processing circuit configured, when the robot is in an object handling environment including a source of objects for transfer to a destination within the object handling environment, to:

obtaining image information of the objects;

identifying a pickable region of one or more of selected object from the objects by:

generating a surface cost map according to height gradients of the image information, segmenting the surface cost map to obtain one or more image segments identifying one or more pickable regions corresponding to the one or more selected object; and generating a pickable region detection result including at least the one or more pickable regions; and generating a motion plan for a robotic system to transfer the one or more selected objects, the motion plan being based on the pickable region detection result.

13. The system of claim 12, wherein the surface cost map is representative of a smoothness of the one or more selected objects.

14. The system of claim 12, wherein the image information includes three-dimensional information and the processing circuit is further configured for generating the surface cost map according to the height gradients and normal differences between defined cells of the image information.

15. The system of claim 14, wherein the at least one processing circuit is further configured for generating the surface cost map according to surface cost map parameters.

16. The system of claim 15, wherein the at least one processing circuit is further configured for:

registering the one or more objects based on the image information to create object registration information; and determining the surface cost map parameters according to the object registration information.

17. The system of claim 12, wherein the at least one processing circuit is further configured for generating detection mask information indicating the one or more pickable regions of the image segments, the detection mask information including detected areas and occluded areas within the one or more image segments.

18. The system of claim 12, wherein segmenting the surface cost map includes:

applying a cost threshold to the surface cost map to generate a thresholded mask;

eroding the thresholded mask to generate an eroded mask; and applying a connected components analysis to the eroded mask to identify a first image segment.

19. The system of claim 18, wherein segmenting the surface cost map further includes:

removing the first image segment from surface cost map;

applying a second cost threshold to a remaining portion of the surface cost map to generate a second thresholded mask;

eroding the second thresholded mask to generate a second eroded mask; and applying the connected components analysis to the second eroded mask to identify a second image segment.

20. The system of claim 12, wherein generating the pickable region detection result further includes generating a safety volume around the one or more pickable regions, the safety volume indicating an estimated remaining portion of the one or more selected objects.

* * * * *